United States Patent
Ohta

(10) Patent No.: US 8,797,264 B2
(45) Date of Patent: Aug. 5, 2014

(54) IMAGE PROCESSING APPARATUS AND STORAGE MEDIUM STORING IMAGE PROCESSING PROGRAM

(75) Inventor: Keizo Ohta, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 451 days.

(21) Appl. No.: 11/522,997

(22) Filed: Sep. 19, 2006

(65) Prior Publication Data

US 2007/0211027 A1    Sep. 13, 2007

(30) Foreign Application Priority Data

Mar. 9, 2006  (JP) .................................. 2006-064439

(51) Int. Cl.

| | |
|---|---|
| *G06F 3/033* | (2013.01) |
| *G09G 5/08* | (2006.01) |
| *G09G 5/00* | (2006.01) |
| *G06K 9/00* | (2006.01) |
| *G06F 3/03* | (2006.01) |
| *G06F 3/0481* | (2013.01) |
| *G06F 3/0346* | (2013.01) |

(52) U.S. Cl.
CPC ............ *G06F 3/0346* (2013.01); *G06F 3/0325* (2013.01); *G06F 3/0481* (2013.01)
USPC ........... 345/158; 345/619; 345/649; 345/650; 345/655; 345/660; 345/661; 345/664; 345/672; 345/676; 345/681; 382/103; 382/106; 382/107

(58) Field of Classification Search
USPC ............................................... 345/619, 158
See application file for complete search history.

(56) References Cited

U.S. PATENT DOCUMENTS

| | | | |
|---|---|---|---|
| 5,309,137 A | 5/1994 | Kajiwara |
| 5,319,387 A | 6/1994 | Yoshikawa |
| 5,574,479 A | 11/1996 | Odell |
| 5,627,565 A | 5/1997 | Morishita et al. |
| 6,982,697 B2 | 1/2006 | Wilson et al. |

(Continued)

FOREIGN PATENT DOCUMENTS

| | | |
|---|---|---|
| JP | 7-302148 A | 11/1995 |
| JP | 8-71252 A | 3/1996 |

(Continued)

OTHER PUBLICATIONS

ADXL202 Specification Sheet: Low Cost ±2 g Dual Axis i MEMs® Accelerometer with Digital Output; Analog Devices, Inc., 1998.

(Continued)

*Primary Examiner* — Maurice L McDowell, Jr.
*Assistant Examiner* — Donna J Ricks
(74) *Attorney, Agent, or Firm* — Nixon & Vanderhye P.C.

(57) ABSTRACT

Predetermined image processing is performed in accordance with an input operation performed by an input device having image pickup means for taking an image of one or a plurality of imaging targets. Target image data, which is obtained from one target image of the one imaging target or a plurality of target images of the plurality of imaging targets in the image taken by the image pickup means and which indicates a distance between the plurality of target images or a size of the one target image, is sequentially obtained. A display image is enlarged and reduced in accordance with a change in the target image data. Then, the display image processed in such a manner is displayed on a display device.

13 Claims, 23 Drawing Sheets

(56) References Cited

U.S. PATENT DOCUMENTS

| | | |
|---|---|---|
| 7,139,983 B2 | 11/2006 | Kelts |
| 7,158,118 B2 | 1/2007 | Liberty |
| 7,262,760 B2 | 8/2007 | Liberty |
| 7,292,151 B2 | 11/2007 | Ferguson et al. |
| 7,379,078 B1 * | 5/2008 | Gossweiler et al. .......... 345/660 |
| 7,414,611 B2 | 8/2008 | Liberty |
| 7,545,956 B2 | 6/2009 | Miyahara |
| 7,672,543 B2 | 3/2010 | Hull et al. |
| 2002/0107069 A1 | 8/2002 | Ishino |
| 2004/0174340 A1 | 9/2004 | Bruneau et al. |
| 2005/0001815 A1 | 1/2005 | Tsunoda |
| 2005/0052415 A1 | 3/2005 | Braun et al. |
| 2005/0137774 A1 | 6/2005 | Rupp |
| 2005/0244034 A1 | 11/2005 | Miyahara |
| 2006/0040738 A1 * | 2/2006 | Okazaki et al. ................ 463/32 |
| 2006/0139327 A1 * | 6/2006 | Dawson et al. ............... 345/158 |
| 2006/0152488 A1 * | 7/2006 | Salsman et al. ............... 345/158 |
| 2007/0060385 A1 | 3/2007 | Dohta |
| 2007/0211027 A1 | 9/2007 | Ohta |

FOREIGN PATENT DOCUMENTS

| | | |
|---|---|---|
| JP | 9-166417 A | 6/1997 |
| JP | 9-265346 A | 10/1997 |
| JP | 11-305935 | 11/1999 |
| JP | 2000-308756 A | 11/2000 |
| JP | 2001-356875 A | 12/2001 |
| JP | 2002-233665 A | 8/2002 |
| JP | 2005-25170 A | 1/2005 |
| JP | 2007-80002 A | 3/2007 |

OTHER PUBLICATIONS

ADXL330 Specification Sheet: Small, Low Power, 3-Axis ±3 g i MEMs® Accelerometer; Analog Devices, Inc., 2007.

Pictures of Microsoft Xwand retrieved on May 13, 2009 from http://www.kf12.com/blogs/uploads/xwand.jpg and http://www.cs.cmu.edu/%7Edwilson/images/xwand.jpg.

Wilson, Andrew D., et al.; "Demonstration of the XWand Interface for Intelligent Spaces"; Microsoft Research; UIST '02 Companion; pp. 37-38.

Wilson, Daniel, et al.; "Gesture Recognition Using the XWand"; Robotics Institute; Carnegie Mellon University; tech report CMU-RI-TR-04-57; Apr. 2004.

Wilson, Andy, "XWand: UI for Intelligent Environments"; Apr. 26, 2004; retrieved May 12, 2009 from http://research.microsoft.com/en-us/um/people/awilson/wand/default.htm.

Wilson, Andrew, et al.; "XWand: UI for Intelligent Spaces"; Microsoft Research; CHI 2003, Apr. 5-10, 2003; Ft. Lauderdale, FL.

Selectech Air Mouse, Description; retrieved on May 5, 2009 from http://cgi.ebay.com.my/ws/eBayISAPI.dII?ViewItem&item=350096666675&indexURL.

* cited by examiner

F I G. 1
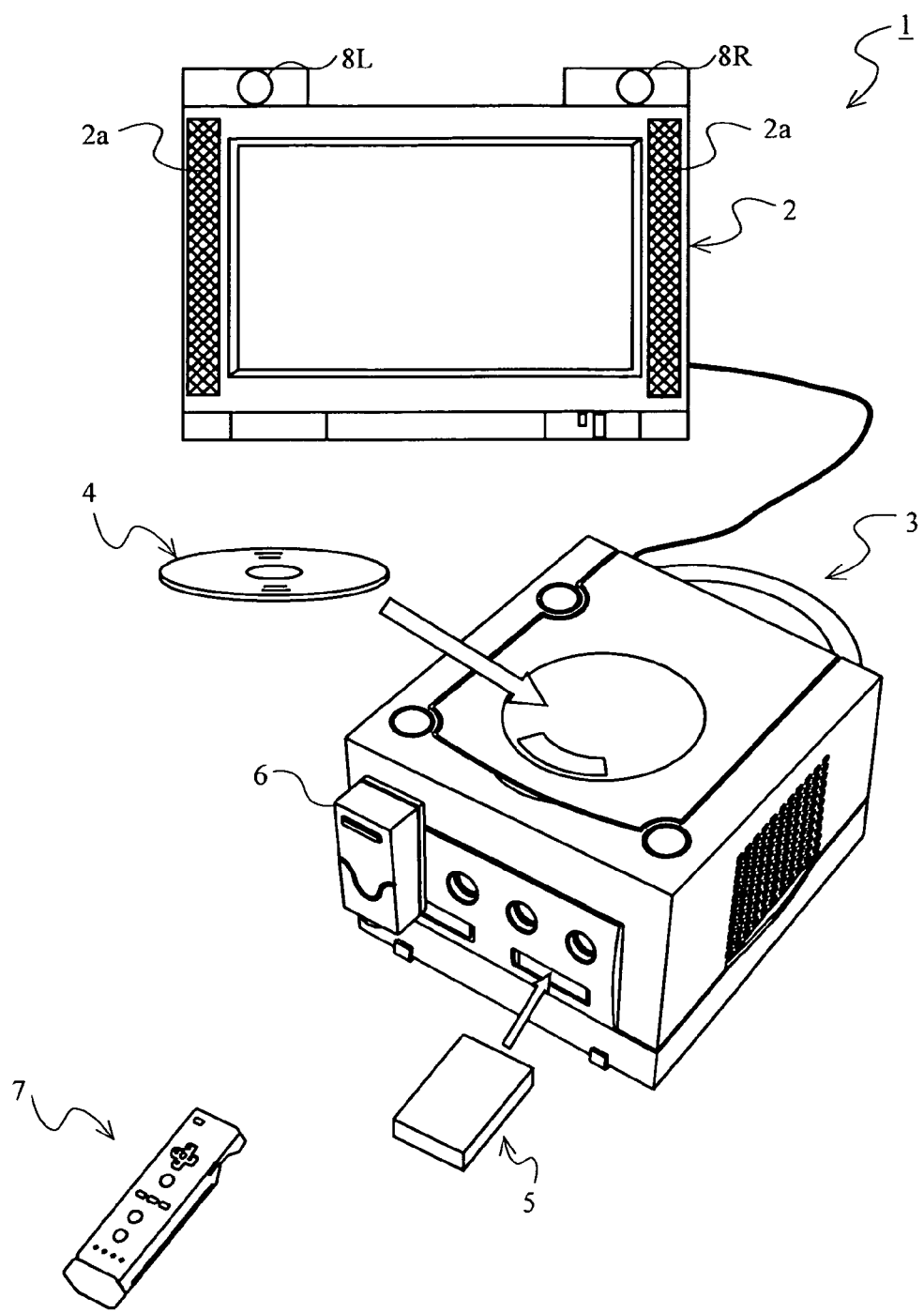

F I G. 6
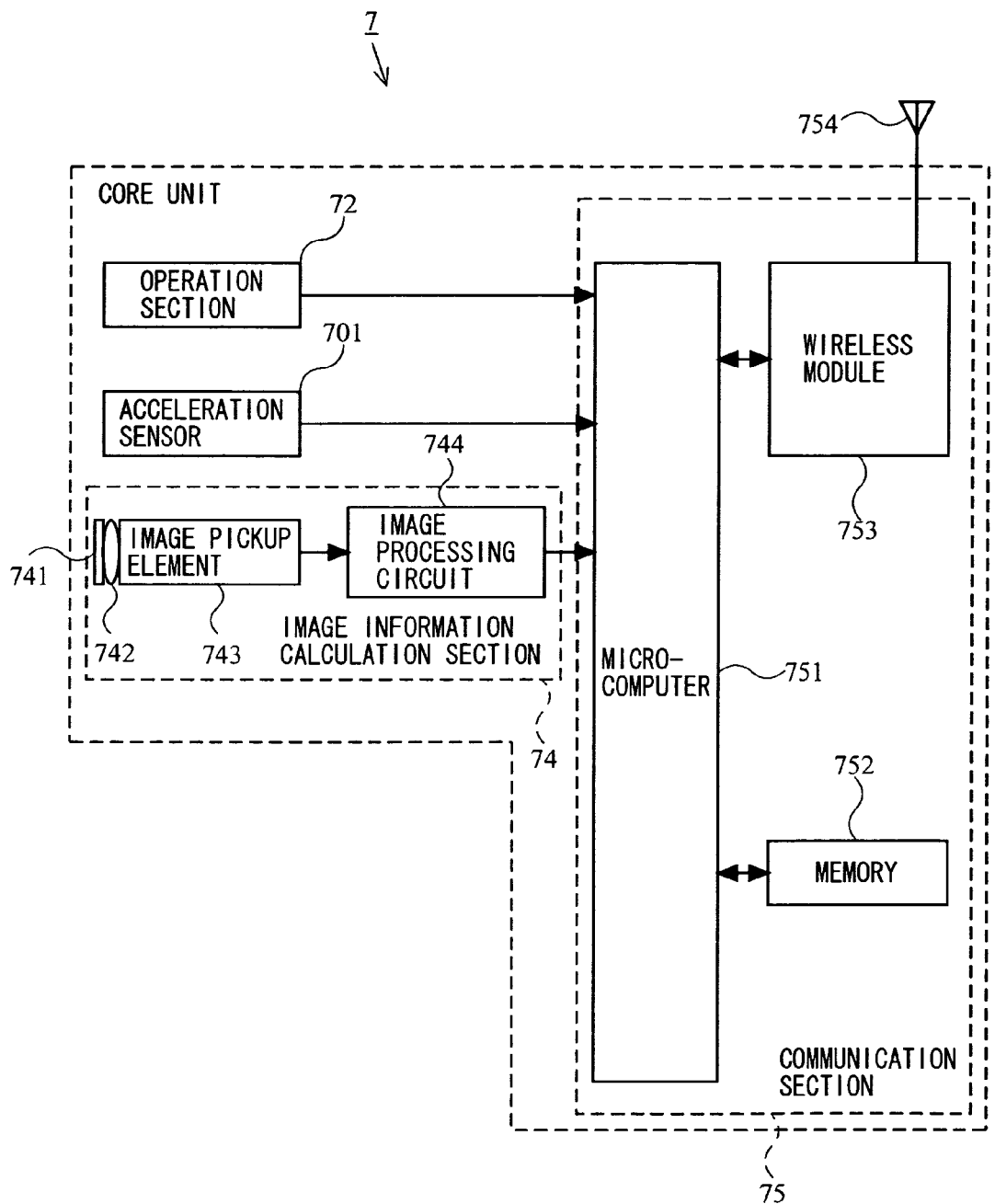

F I G. 7
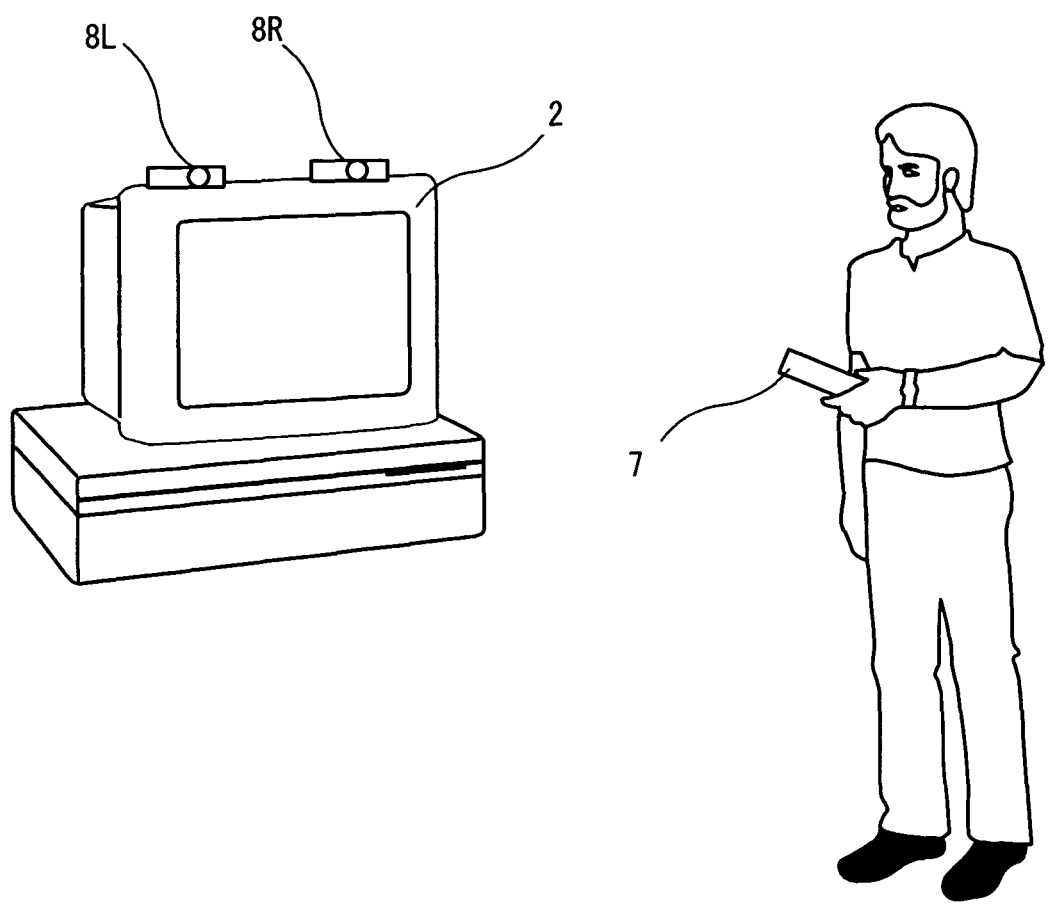

F I G. 9
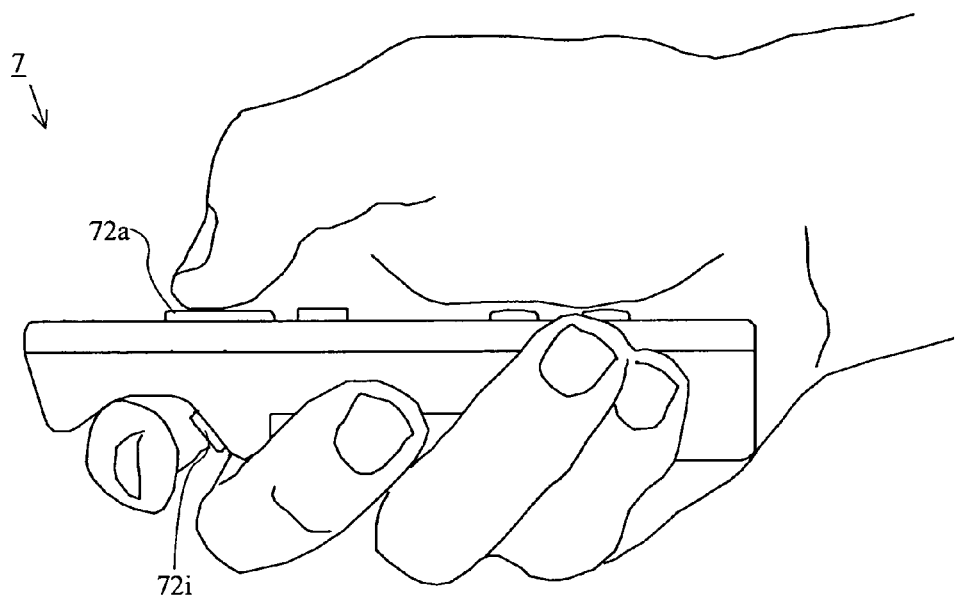

FIG. 17
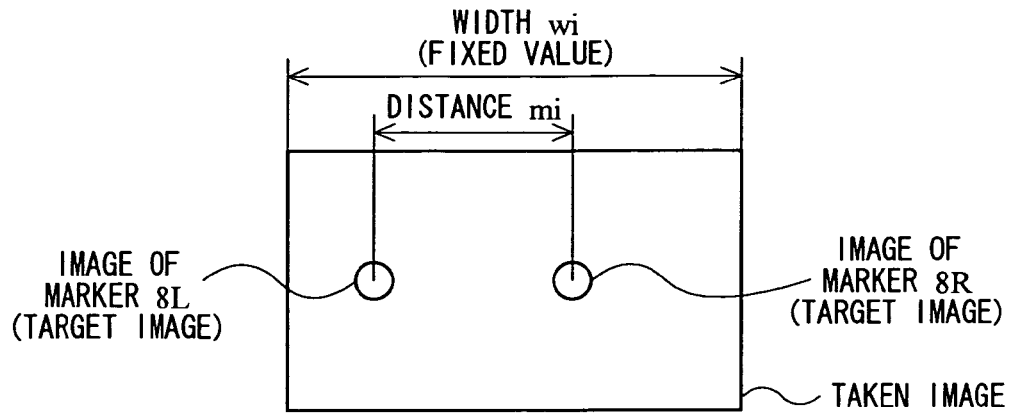
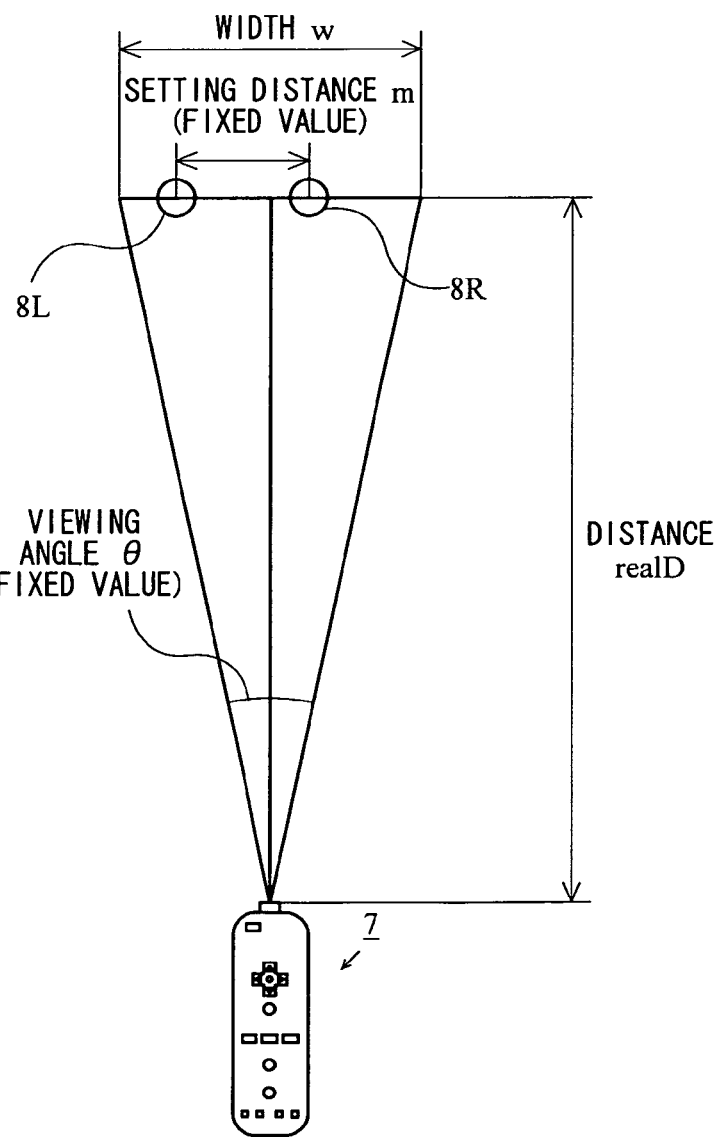

F I G. 1 8
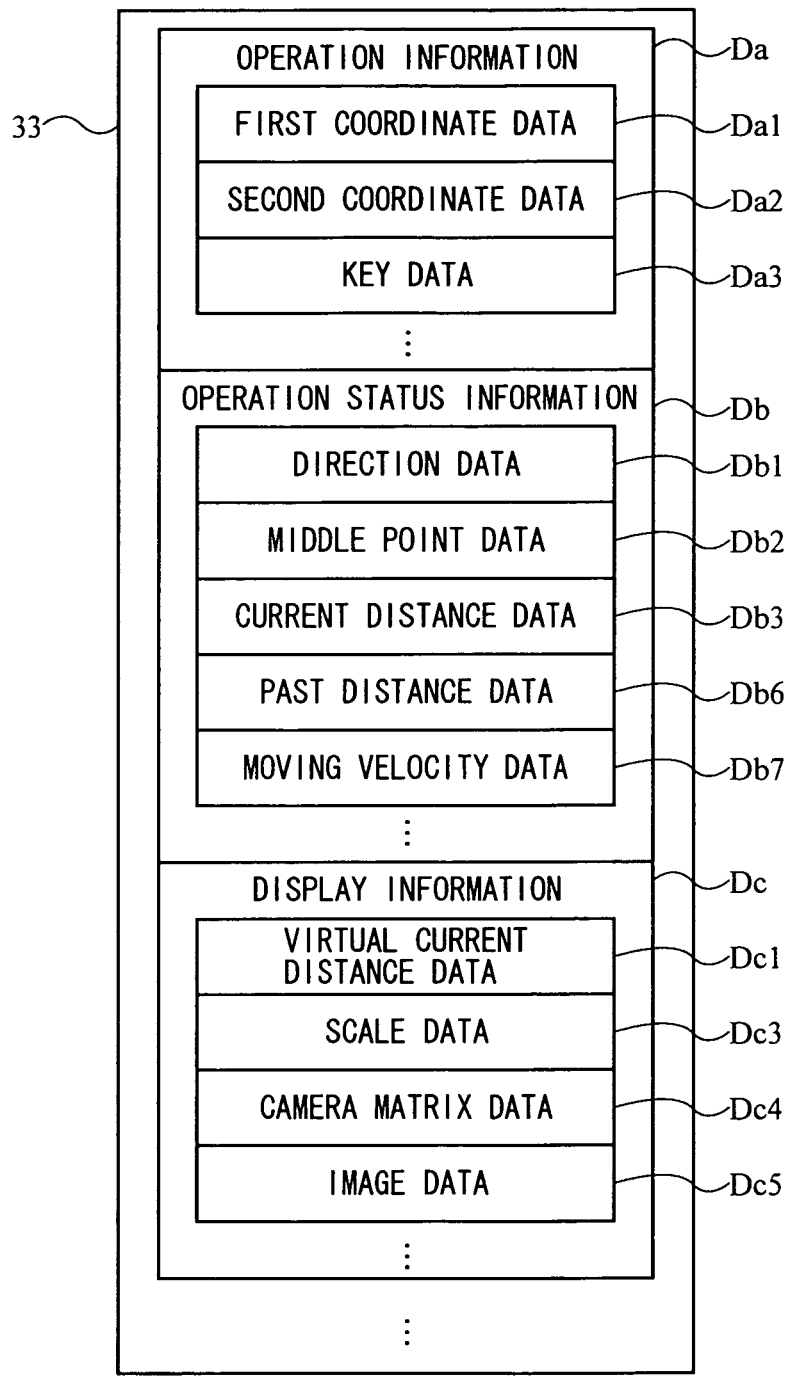

FIG. 21
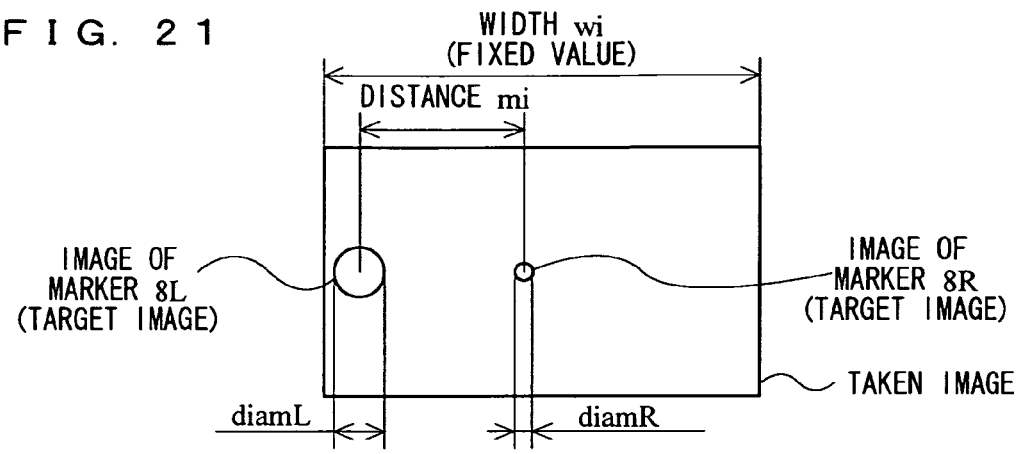
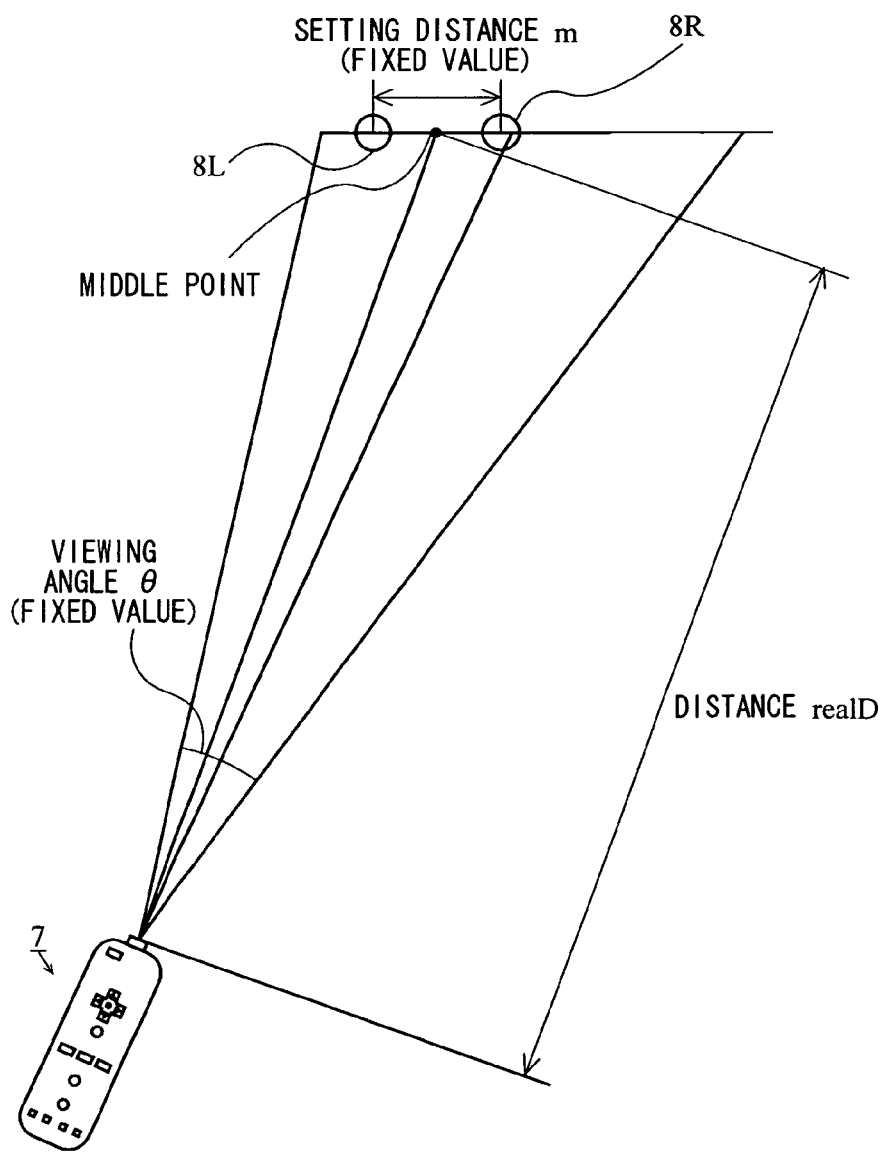

IMAGE PROCESSING APPARATUS AND STORAGE MEDIUM STORING IMAGE PROCESSING PROGRAM

CROSS REFERENCE TO RELATED APPLICATION

The disclosure of Japanese Patent Application No. 2006-064439 is incorporated herein by reference.

BACKGROUND

1. Field of the Technology

The technology presented herein relates to an image processing apparatus and a storage medium storing an image processing program, and particularly to an image processing apparatus operated by using an input device having image pickup means and a storage medium storing an image processing program.

2. Description of the Background Art

There have been disclosed position detection systems, in which a light source of an infrared light is used as a marker whose image is taken, and the taken image is analyzed to obtain a position aimed at by a user. One of such systems is disclosed in, e.g., Japanese Laid-Open Patent Publication No. 11-305935 (hereinafter, referred to as a patent document 1).

The patent document 1 discloses a game as an embodiment of a position detection system in which a player uses, as a game controller, a gun having an image pickup device mounted thereon, and performs shooting. In the system, four light sources each emitting an infrared light are respectively fixed, on four corners of a display screen, as imaging targets of the image pickup device, and a position on the display screen pointed by the gun is detected based on positions of the imaging targets in an image taken by the image pickup device. Then, a virtual shooting game is executed by using the position pointed by the gun as a position aimed at by the player. As disclosed in the 21st paragraph of the patent document 1, in the case where the player is allowed to discretionarily change a distance between the image pickup device and a target (i.e., a distance between the image pickup device and the markers), the image pickup device is provided with a controllable zoom function, and the zoom function is controlled such that each of the markers in the taken image is always in an appropriate size, thereby detecting the aimed position precisely.

However, there has not been a technique in which a distance between an input device (game controller) and an imaging target is used for an input operation. For example, in the position detection system disclosed in the patent document 1, the distance between the image pickup device and the markers is used merely for adjustment. In fact, changes in such a distance are negative factors which interfere with precise operation inputs.

SUMMARY

Therefore, a feature of an example embodiment presented herein is to provide an image processing apparatus and a storage medium storing an image processing program which realize highly flexible new operations performed by using an input device having image pickup means.

The example embodiment has the following features to achieve the above. Note that reference numerals, step numbers (here, "step" is abbreviated as "S") and the like indicated between parentheses are merely provided to facilitate the understanding of the example embodiment in relation to the drawings and the later-described embodiment, rather than limiting the scope of the example embodiment in any way.

A first aspect of the example embodiment is an image processing apparatus (3) (see FIG. 1) for performing predetermined image processing in accordance with an input operation performed by an input device (7) including image pickup means (74) for taking an image of one or a plurality of imaging targets (8). The image processing apparatus comprises (see FIGS. 15-16) target image data obtaining means (S72), image processing means (S60, S62) and display control means (S63). The target image data obtaining means is means for sequentially obtaining, from one target image of the one imaging target or a plurality of target images of the plurality of imaging targets in the image taken by the image pickup means, target image data (mi, diamL, diamR) indicating a distance between the plurality of target images or a size of the one target image. The image processing means is means for performing at least either one of enlargement and reduction of a display image in accordance with a change in the target image data. The display control means is means for displaying on a display device (2) the display image processed by the image processing means. Here, the target image data contains, for example, a distance between the plurality of target images in the taken image or a size (such as a diameter or width) of the one target image in the taken image.

In a second aspect of the example embodiment, the image processing means includes (see FIGS. 15, 19) distance calculation means (S53, S83) and enlarging/reducing means. The distance calculation means is means for, based on the target image data, sequentially calculating a distance (realD) between the image pickup means and the one or the plurality of the imaging targets. The enlarging/reducing means is means for performing at least either one of enlargement and reduction of the display image in accordance with a change in the distance.

In another aspect the example embodiment, the image processing means performs at least either one of enlargement and reduction of the display image in accordance with the change which occurs, during a predetermined time period, in the distance.

In another aspect of the example embodiment, the input device includes (see FIGS. 3, 14) at least one pressable operation key (72) and outputs at least operation information (Da3) corresponding to a state of the operation key being pressed. The image processing apparatus further comprises (see FIGS. 15, 19) operation information obtaining means (S51, S81) and storage means (S56). The operation information obtaining means is means for obtaining the operation information. The storage means is means for, when the operation information indicates that the operation key has just started being pressed, storing the distance calculated by the distance calculation means (33). The image processing means includes (see FIG. 15) difference calculation means (S58) for obtaining the change in the distance, which occurs during the predetermined time period which is a time period during which the operation key is pressed, by sequentially calculating a difference (moveD) between the distance (initD) stored in the storage means and the distance (realD) which is calculated, while the operation information indicates that the operation key is currently pressed, by the distance calculation means. The image processing means performs at least either one of enlargement and reduction of the display image in accordance with the difference.

In other aspects of the example embodiment, the image processing means enlarges the display image in accordance with an increase in the distance, and reduces the display image in accordance with a decrease in the distance (S>0).

In other aspects of the example embodiment, the image processing means reduces the display image in accordance with an increase in the distance, and increases the display image in accordance with a decrease in the distance (S<O).

In another aspect of the example embodiment, the image processing apparatus further comprises designated coordinates calculation means for, based on a position of the one target image or positions of the plurality of target images in the taken image, calculating designated coordinates associated with a display area of the display device. The image processing means moves the display image in accordance with a change in the designated coordinates (FIG. 13A).

In another aspect of the example embodiment, the image processing apparatus further comprises tilt calculation means for, based on a position of the one target image or positions of the plurality of target images in the taken image, calculating a tilt of the input device. The image processing means rotates the display image in accordance with a change in the tilt (FIG. 13B).

In another aspect of the example embodiment, the image processing means performs at least either one of enlargement and reduction of the display image by sequentially changing, in accordance with the change in the distance, a position of a virtual camera placed in a virtual space.

In another aspect of the example embodiment, the image processing means performs at least either one of enlargement and reduction of the display image by sequentially changing, in accordance with the change in the distance, a display size of a two-dimensional image.

In another aspect of the example embodiment, the image processing apparatus further comprises velocity calculation means (S84) for, based on the target image data, sequentially calculating a moving velocity (velD) of the input device with respect to the one or the plurality of imaging targets. The image processing means performs at least either one of enlargement and reduction of the display image in accordance with the moving velocity.

Another aspect of the example embodiment is a storage medium storing an image processing program executed by a computer (30) performing image processing in accordance with an input operation performed by an input device including image pickup means for taking an image of one or a plurality of imaging targets. The image processing program causes the computer to perform a target image data obtaining step, an image processing step and a display control step. The target image data obtaining step is a step of sequentially obtaining, from one target image of the one imaging target or a plurality of target images of the plurality of imaging targets in the image taken by the image pickup means, target image data indicating a distance between the plurality of target images or a size of the one target image. The image processing step is a step of performing at least either one of enlargement and reduction of a display image in accordance with a change in the target image data. The display control step is a step of displaying on a display device the display image processed at the image processing step.

In another aspect, the image processing step includes a distance calculation step and an enlarging/reducing step. The distance calculation step is a step of, based on the target image data, sequentially calculating a distance between the image pickup means and the one or the plurality of the imaging targets. The enlarging/reducing step is a step of performing at least either one of enlargement and reduction of the display image in accordance with a change in the distance.

In another aspect, the image processing step performs at least either one of enlargement and reduction of the display image in accordance with the change which occurs, during a predetermined time period, in the distance.

In another aspect, the input device includes at least one pressable operation key and outputs at least operation information corresponding to a state of the operation key being pressed. The image processing program further causes the computer to perform an operation information obtaining step and a storage control step. The operation information obtaining step is a step of obtaining the operation information. The storage control step is a step of, when the operation information indicates that the operation key has just started being pressed, storing in a memory the distance calculated at the distance calculation step. The image processing step includes a difference calculation step of obtaining the change in the distance, which occurs during the predetermined time period which is a time period during which the operation key is pressed, by sequentially calculating a difference between the distance stored in the memory and the distance which is calculated, while the operation information indicates that the operation key is currently pressed, at the distance calculation step. The image processing step performs at least either one of enlargement and reduction of the display image in accordance with the difference.

In other aspects, at the image processing step, the display image is enlarged in accordance with an increase in the distance, and reduced in accordance with a decrease in the distance.

In other aspects respectively based on the seventeenth, twentieth and twenty-third aspects, at the image processing step, the display image is reduced in accordance with an increase in the distance, and enlarged in accordance with a decrease in the distance.

In another aspect, the image processing program further causes the computer to perform a designated coordinates calculation step of, based on a position of the one target image or positions of the plurality of target images in the taken image, calculating designated coordinates associated with a display area of the display device. At the image processing step, the display image is moved in accordance with a change in the designated coordinates.

In another aspect, the image processing program further causes the computer to perform a tilt calculation step of, based on a position of the one target image or positions of the plurality of target images in the taken image, calculating a tilt of the input device. At the image processing step, the display image is rotated in accordance with a change in the tilt.

In another aspect, the image processing step performs at least either one of enlargement and reduction of the display image by sequentially changing, in accordance with the change in the distance, a position of a virtual camera placed in a virtual space.

In another aspect, the image processing step performs at least either one of enlargement and reduction of the display image by sequentially changing, in accordance with the change in the distance, a display size of a two-dimensional image.

In another aspect, the image processing program further causes the computer to perform a velocity calculation step of, based on the target image data, sequentially calculating a moving velocity of the input device with respect to the one or the plurality of imaging targets. The image processing step performs at least either one of enlargement and reduction of the display image in accordance with the moving velocity.

According to the above aspect, the display image may be enlarged or reduced in accordance with the target image data which is obtained from the one or the plurality of target images and which indicates a space between the plurality of target images or the size of the one target image (i.e., the distance between the plurality of target images of the plurality of imaging targets in the taken image, or measurements such as a diameter, width, square measure and the like of the one target image of the one imaging target in the taken image). This realizes new and intuitive image processing operations.

According to the above aspect, the distance between the input device and the imaging target(s) is obtained from the target image data of the one or the plurality of target images. By using the distance, new and intuitive operations are realized.

According to the above aspect, controlling the enlargement and reduction of the display image is easy for a user since a time period during which the enlargement and reduction of the display image is performed is specified.

According to the above aspect, controlling the enlargement and reduction of the display image is easy for a user, since the time period during which the enlargement and reduction of the display image is performed is specified as the time period during which the operation key is pressed.

According to the above aspects, a user is allowed to perform an intuitive operation which enables the user to feel as if the user were grabbing an image displayed on the display device.

According to the above aspects, a user is allowed to perform an intuitive operation which enables the user to feel as if the user were operating a camera for taking an image to be displayed on the display device.

According to the above aspect, a user is allowed to perform an operation to grab an image displayed on the display device and move the image from side to side and up and down. Further, a user is allowed to perform a more complicated and intuitive operation by using the position of the input device in addition to the distance between the input device and the imaging target(s).

According to the above aspect, a user is allowed to perform an operation to grab an image displayed on the display device and rotate the image. Further, a user is allowed to perform a more complicated and intuitive operation by using the tilt of the input device in addition to the distance between the input device and the imaging target(s).

According to the above aspect, when an image of an object in the virtual space is displayed on the display device, the enlargement and reduction of the displayed image can be easily performed.

According to the above aspect, when a two-dimensional image is displayed on the display device, the enlargement and reduction of the displayed two-dimensional image can be easily performed.

According to the above aspect, since the moving speed of the input device with respect to the imaging target(s) is obtained from the target image data of the target image(s), a new and intuitive operation using the moving speed is realized.

The storage medium storing the image processing program according to the example embodiment presented herein produces same effects as those of the above-described image processing apparatus when the image processing program is executed by a computer.

These and other features, aspects and advantages of the example embodiment will become more apparent from the following detailed description of the example embodiment when taken in conjunction with the accompanying drawings.

BRIEF DESCRIPTION OF THE DRAWINGS

FIG. 1 is an external view illustrating a game system 1 according to an embodiment;

FIG. 6 is a block diagram showing an internal structure of the controller 7 of FIG. 3;

FIG. 7 is an illustration briefly showing a state where a player uses the controller 7 of FIG. 3 to perform game operations;

FIG. 9 shows an exemplary state of a player holding the controller 7 with a right hand as seen from a left side of the controller 7;

FIG. 17 is a diagram used to describe an exemplary manner of calculating a current distance realD;

FIG. 18 shows another example of main data stored in the main memory 33 of the game apparatus 3;

FIG. 21 is a diagram used to describe another exemplary manner of calculating the current distance realD;

DESCRIPTION OF THE PREFERRED EMBODIMENTS

Figure 2:
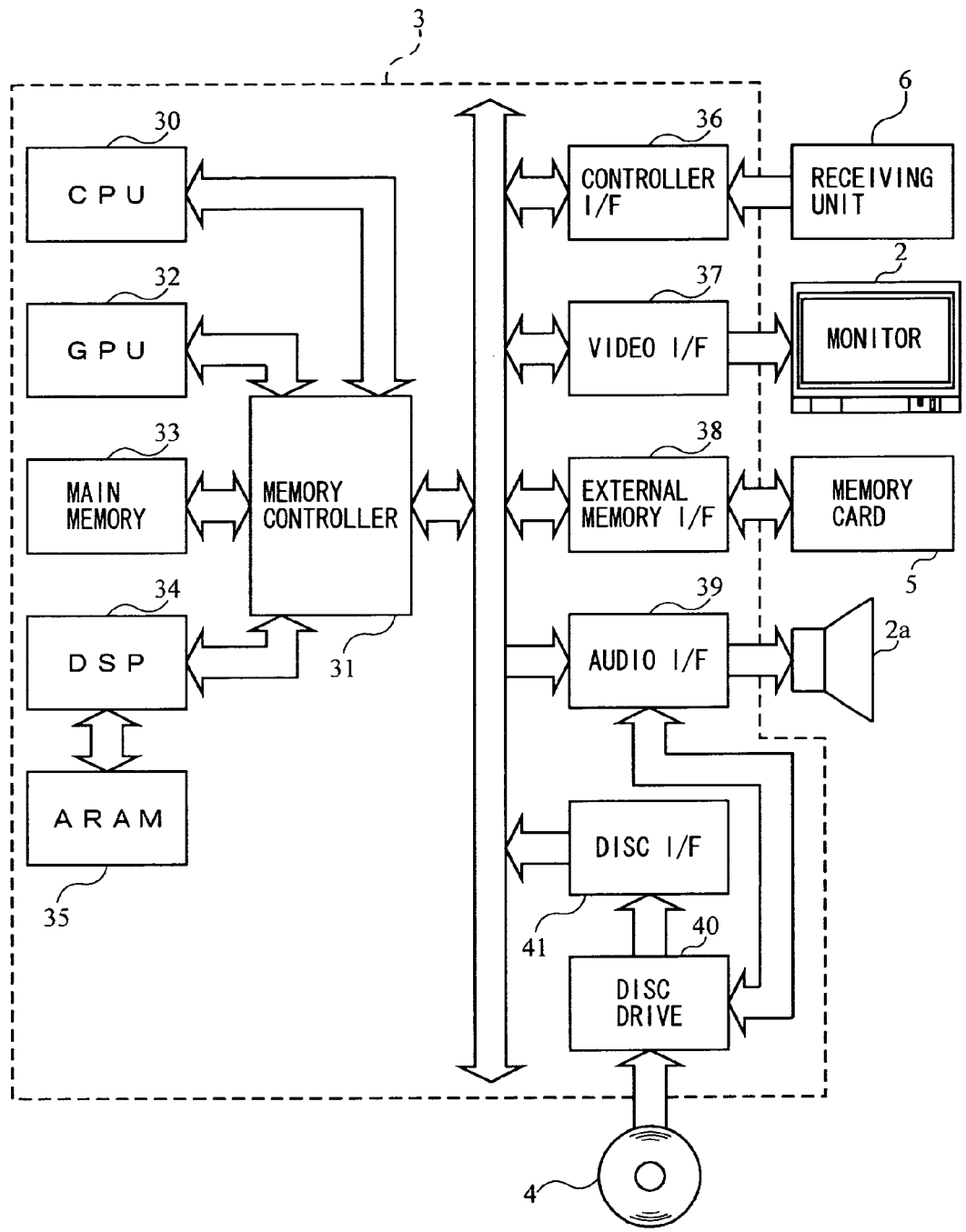
FIG. 2 is a functional block diagram of a game apparatus 3 shown in FIG. 1.

With reference to FIG. 1, an image processing apparatus according to one embodiment will be described. Hereinafter, in order to give a specific description, a game system 1 using the image processing apparatus according to an example embodiment will be used as an example. FIG. 1 is an external view illustrating the game system 1. In the following description, the game system 1 uses a stationary game apparatus which is an example of the image processing apparatus according to the example embodiment.

As shown in FIG. 1, the game system 1 comprises a stationary game apparatus 3 (hereinafter, simply referred to as a "game apparatus 3") connected via a connection cord to a display 2 (hereinafter, referred to as a "monitor 2") such as a home-use TV receiver having a speaker 2a, and a controller 7 for giving operation information to the game apparatus 3. The game apparatus 3 is connected to a receiving unit 6 via a connection terminal. The receiving unit 6 receives transmission data which is wirelessly transmitted from the controller 7. The controller 7 and the game apparatus 3 are connected to each other by radio communication. On the game apparatus 3, an optical disc 4 as an example of an exchangeable information storage medium is detachably mounted. Provided on a top main surface of the game apparatus 3 are a power ON/OFF switch, a game process reset switch, and an OPEN switch for opening a top lid of the game apparatus 3. When a player presses the OPEN switch, the lid opens, thereby allowing the optical disc 4 to be mounted or dismounted.

On the game apparatus 3, an external memory card 5 is detachably mounted when necessary. The external memory card 5 has a backup memory or the like mounted thereon for fixedly storing saved data or the like. The game apparatus 3 executes a game program or the like stored on the optical disc 4, and displays a result thereof as a game image on the monitor 2. It is assumed here that an image processing program of the present invention is a part of the game program stored in the optical disc 4. The game apparatus 3 can also reproduce a state of a game played in the past, by using the saved data stored on the external memory card 5, and display on the monitor 2 a game image of the reproduced state. A player playing with the game apparatus 3 can enjoy the game by operating the controller 7 while watching the game image displayed on the monitor 2.

By using the technology of, for example, Bluetooth (registered trademark), the controller 7 wirelessly transmits the transmission data from a communication section 75 included therein (described later) to the game apparatus 3 connected to the receiving unit 6. The controller 7 is operation means for mainly operating a player object appearing in a game space displayed on the monitor 2. The controller 7 includes an operation section having a plurality of operation buttons, a key, a stick and the like. As described later in detail, the controller 7 also includes an imaging information calculation section 74 for taking an image viewed from the controller 7. As exemplary imaging targets of the imaging information calculation section 74, two LED modules 8L and 8R (hereinafter, referred to as "markers 8L and 8R") are provided in the vicinity of a display screen of the monitor 2. The markers 8L and 8R each output an infrared light forward from the monitor 2.

With reference to FIG. 2, a structure of the game apparatus 3 will be described. FIG. 2 is a functional block diagram of the game apparatus 3.

As shown in FIG. 2, the game apparatus 3 includes, for example, a RISC CPU (central processing unit) 30 for executing various types of programs. The CPU 30 executes a boot program stored in a boot ROM (not shown) to, for example, initialize memories such as a main memory 33, and then executes a game program stored on the optical disc 4 to perform a game process or the like in accordance with the game program. The CPU 30 is connected via a memory controller 31 to a GPU (Graphics Processing Unit) 32, the main memory 33, a DSP (Digital Signal Processor) 34, and an ARAM (Audio RAM) 35. The memory controller 31 is connected via a predetermined bus to a controller I/F (interface) 36, video I/F 37, external memory I/F 38, audio I/F 39, and a disc I/F 41. The controller I/F 36, video I/F 37, external memory I/F 38, audio I/F 39 and the disc I/F 41 are respectively connected to a receiving unit 6, the monitor 2, the external memory card 5, the speaker 2a and a disc drive 40.

The GPU 32 performs image processing based on an instruction from the CPU 30. The GPU 32 includes, for example, a semiconductor chip for performing a calculation process necessary for displaying 3D graphics. The GPU 32 performs image processing by using a memory dedicated for image processing (not shown) and apart of a storage area of the main memory 33. The GPU 32 generates, by using such memories, game image data or moving images to be displayed on the monitor 2, and outputs the generated data or moving images to the monitor 2 via the memory controller 31 and video I/F 37 as necessary.

The main memory 33 is a storage area used by the CPU 30, which stores as necessary a game program or the like used for processes performed by the CPU 30. For example, the main memory 33 stores a game program read from the optical disc 4 by the CPU 30 and various types of data. The game program and the various types of data which are stored in the main memory 33 are executed by the CPU 30.

The DSP 34 processes sound data and the like generated by the CPU 30 during the execution of the game program. The DSP 34 is connected to the ARAM 35 for storing the sound data and the like. The ARAM 35 is used when the DSP 34 performs a predetermined process (for example, when the DSP 34 stores the game program or sound data which has been previously read). The DSP 34 reads the sound data stored in the ARAM 35, and outputs the sound data to the speaker 2a of the monitor 2 via the memory controller 31 and the audio I/F 39.

The memory controller 31 comprehensively controls data transfer, and is connected to the above-described various I/Fs. The controller I/F 36 includes, for example, four controllers I/F 36a to 36d, and communicably connects, by connectors of the controllers I/F 36a to 36d, the game apparatus 3 to an external device which is engageable with the connectors. For example, the receiving unit 6 is engaged with such connectors and is connected to the game apparatus 3 via the controller I/F 36. As described above, the receiving unit 6 receives the transmission data from the controller 7, and outputs the transmission data to the CPU 30 via the controller I/F 36. The video I/F 37 is connected to the monitor 2. The external memory I/F 38 is connected to the external memory card 5, thereby being able to access a backup memory or the like provided within the external memory card 5. The audio I/F 39 is connected to the speaker 2a built in the monitor 2, such that the sound data read by the DSP 34 from the ARAM 35 or sound data directly outputted from the disc drive 40 is outputted from the speaker 2a. The disc I/F 41 is connected to the disc drive 40. The disc drive 40 reads data stored in a predetermined reading position of the optical disc 4, and outputs the read data to the bus of the game apparatus 3 or the audio I/F 39.

Figure 3:
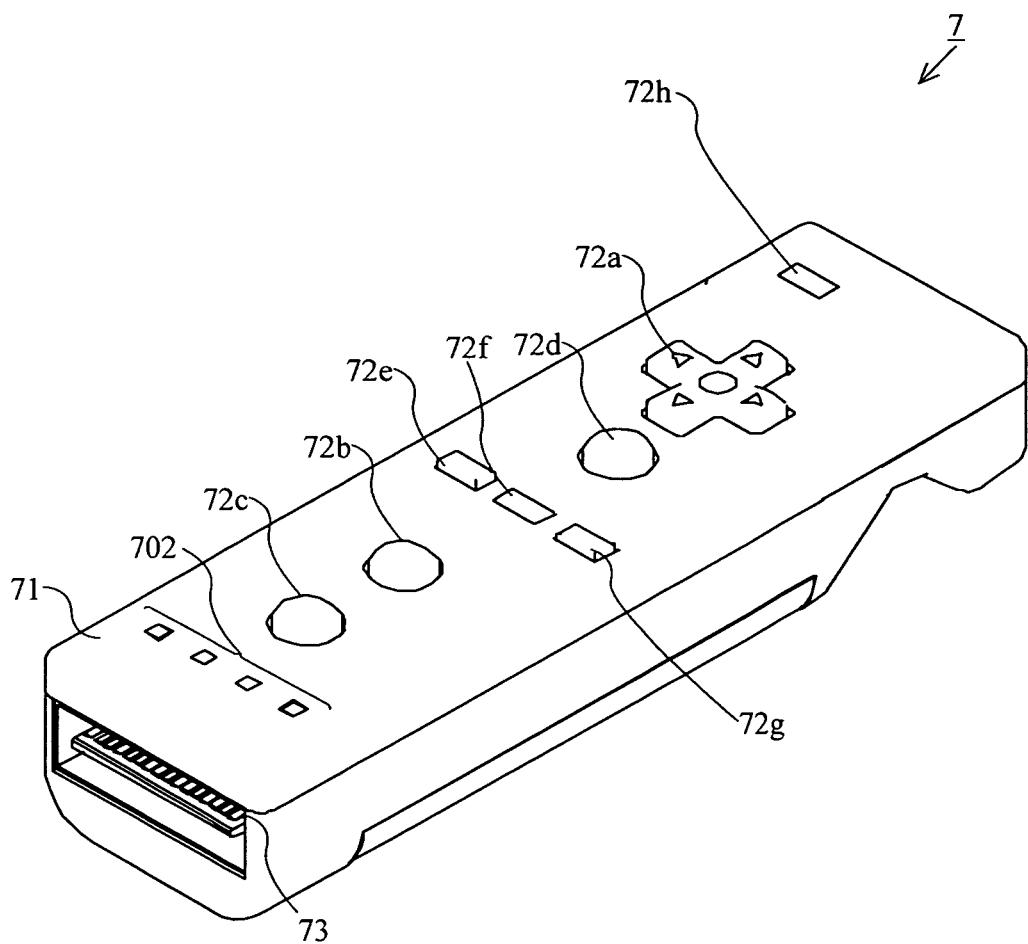
FIG. 3 is an isometric view of a controller 7 of FIG. 1 seen from a top rear side thereof.
Figure 4:
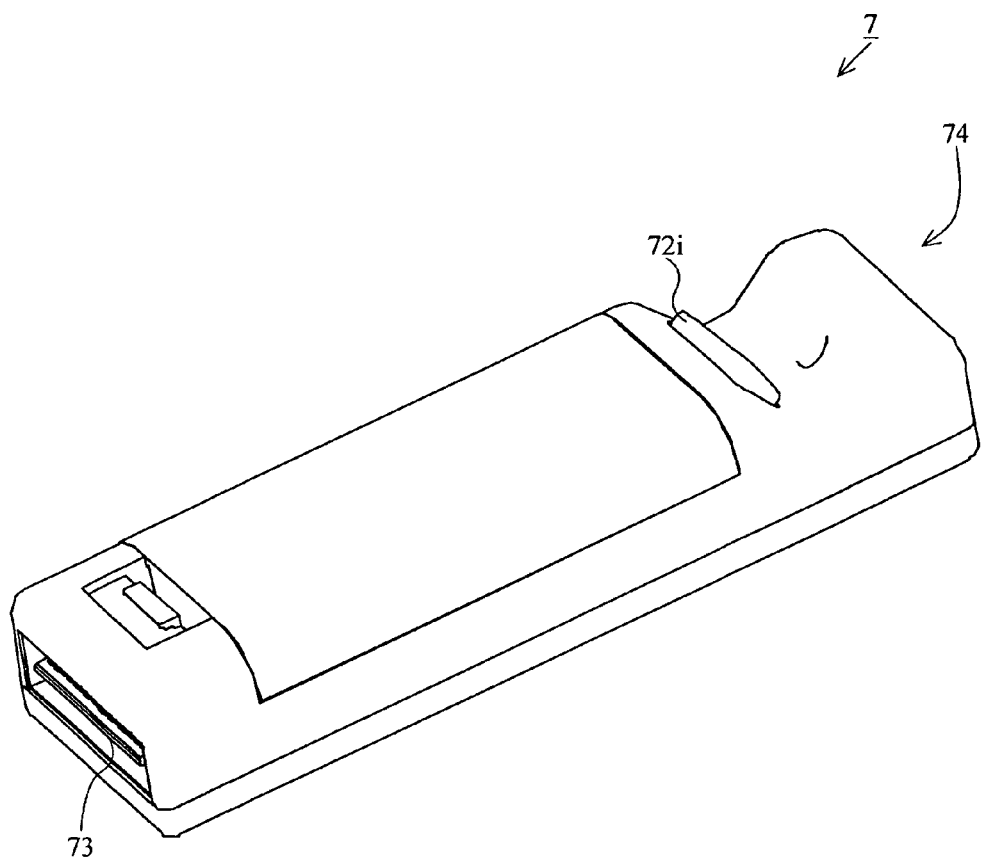
FIG. 4 is an isometric view of the controller 7 of FIG. 1 seen from a bottom rear side thereof.

With reference to FIGS. 3 and 4, the controller 7 will be described. FIG. 3 is an isometric view of the controller 7 seen from a top rear side thereof. FIG. 4 is an isometric view of the controller 7 seen from a bottom rear side thereof.

As shown in FIGS. 3 and 4, the controller 7 includes a housing 71 formed by plastic molding or the like. The housing 71 has a plurality of operation sections 72. The housing 71 has a generally parallelepiped shape extending in a longitudinal direction from front to rear. The overall size of the housing 71 is small enough to be held by one hand of an adult or even a child.

At the center of a front part of a top surface of the housing 71, a cross key 72a is provided. The cross key 72a is a cross-shaped four-direction push switch. The cross key 72a includes operation portions corresponding to four directions indicated by arrows (front, rear, right and left), which are respectively located on cross-shaped projecting portions arranged at intervals of 90 degrees. A player selects one of the front, rear, right and left directions by pressing one of the operation portions of the cross key 72a. Through an operation of the cross key 72a, the player can, for example, indicate a direction in which a player character or the like appearing in a virtual game world is to move, or a direction in which a cursor is to move.

The cross key 72a is an operation section for outputting an operation signal in accordance with the above-described direction input operation performed by the player. Such an operation section may be provided in another form. For example, the cross key 72a may be replaced with a composite switch including a push switch having a ring-shaped four-direction operation section and a center switch provided at the center thereof. Alternatively, the cross key 72a may be replaced with an operation section which includes an inclinable stick projecting from a top surface of the housing 71 and which outputs an operation signal in accordance with an inclining direction of the stick. Still alternatively, the cross key 72a may be replaced with an operation section which includes a disc-shaped member horizontally slidable and which outputs an operation signal in accordance with a sliding direction of the disc-shaped member. Still alternatively, the cross key 72a may be replaced with a touch pad. Still alternatively, the cross key 72a may be replaced with an operation section which includes switches indicating at least four directions (front, rear, right and left) and which outputs an operation signal in accordance with any of the switches pressed by the player.

Behind the cross key 72a on the top surface of the housing 71, a plurality of operation buttons 72b to 72g are provided. The operation buttons 72b to 72g are each an operation section for, when the player presses a head thereof, outputting a corresponding operation signal. For example, functions as an X button, a Y button and a B button are assigned to the operation buttons 72b to 72d. Also, functions as a select switch, a menu switch and a start switch are assigned to the operation buttons 72e to 72g, for example. Although various functions are assigned to the operation buttons 72b to 72g in accordance with the game program executed by the game apparatus 3, this will not be described in detail because the functions are not directly relevant to the present invention. In an exemplary arrangement shown in FIG. 3, the operation buttons 72b to 72d are arranged in a line at the center in a front-rear direction on the top surface of the housing 71. The operation buttons 72e to 72g are arranged on the top surface of the housing 71 in a line in a left-right direction between the operation buttons 72b and 72d. The operation button 72f has a top surface thereof buried in the top surface of the housing 71, so as not to be inadvertently pressed by the player.

In front of the cross key 72a on the top surface of the housing 71, an operation button 72h is provided. The operation button 72h is a power switch for turning on and off the power to the game apparatus 3 by remote control. The operation button 72h also has a top surface thereof buried in the top surface of the housing 71, so as not to be inadvertently pressed by the player.

Behind the operation button 72c on the top surface of the housing 71, a plurality of LEDs 702 are provided. A controller type (number) is assigned to the controller 7 such that the controller 7 is distinguishable from the other controllers 7. Here, the LEDs 702 are used for, e.g., informing the player about the controller type which is currently set for the controller 7. Specifically, when the controller 7 transmits the transmission data to the receiving unit 6, one of the plurality of LEDs 702 which corresponds to the controller type of the controller 7 is lit up.

On a bottom surface of the housing 71, a recessed portion is formed. As described later in detail, the recessed portion is formed in a position in which an index finger or middle finger of the player is located when the player holds the controller 7. On a rear slope surface of the recessed portion, an operation button 72i is provided. The operation button 72i is an operation section acting as, for example, an A button. The operation button 72i is used, for example, as a trigger switch in a shooting game, or for attracting attention of a player object to a predetermined object. In the present invention, the operation button 72i acts as a drag button for, e.g., grabbing an object displayed on the monitor 2. When the player presses the operation button 72i, an object displayed on the monitor 2 is grabbed.

On a front surface of the housing 71, an image pickup element 743 constituting a part of the imaging information calculation section 74 is provided. The imaging information calculation section 74 is a system for analyzing image data of an image taken by the controller 7, thereby identifying an area having a high brightness in the image and calculating a position of a center of gravity, a size and the like of the area. The imaging information calculation section 74 has, for example, a maximum sampling period of about 200 frames/sec, and therefore can trace and analyze even a relatively fast motion of the controller 7. A configuration of the imaging information calculation section 74 will be described later in detail. On a rear surface of the housing 71, a connector 73 is provided. The connector 73 is, for example, a 32-pin edge connector, and is used for engaging and connecting the controller 7 with a connection cable.

Figure 5A:
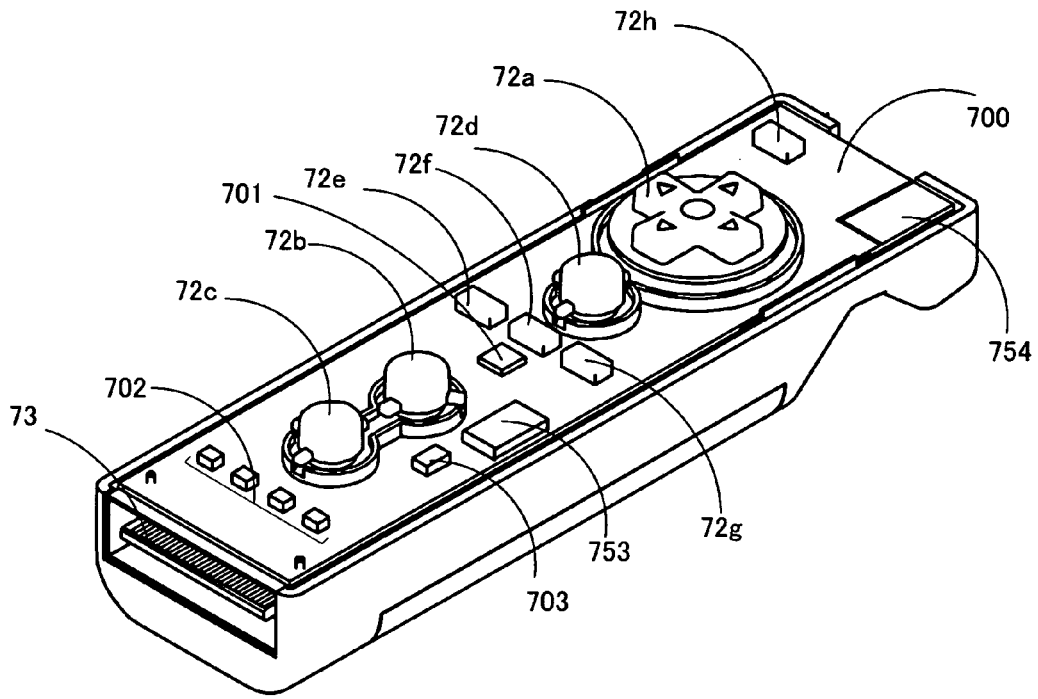
FIG. 5A is an isometric view illustrating a state where an upper casing of the controller 7 of FIG. 3 is removed.
Figure 5B:
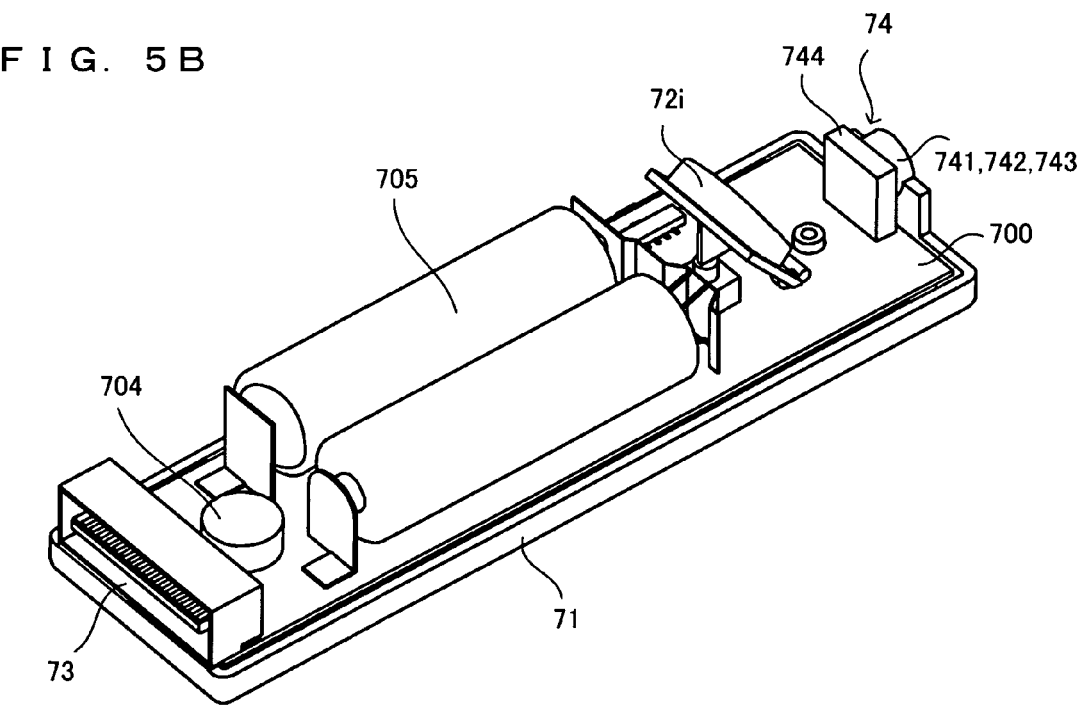
FIG. 5B is an isometric view illustrating a state where a lower casing of the controller 7 of FIG. 4 is removed.

With reference to FIGS. 5A and 5B, an internal structure of the controller 7 will be described. FIG. 5A is an isometric view illustrating a state where an upper casing (a part of the housing 71) of the controller 7 is removed. FIG. 5B is an isometric view illustrating a state where a lower casing (a part of the housing 71) of the controller 7 is removed. FIG. 5B shows a reverse side of a substrate 700 shown in FIG. 5A.

As shown in FIG. 5A, the substrate 700 is fixed inside the housing 71. On a top main surface of the substrate 700, the operation buttons 72a to 72h, an acceleration sensor 701, the LEDs 702, a quartz oscillator 703, a wireless module 753, an antenna 754 and the like are provided. These elements are connected to a microcomputer 751 (see FIG. 6) by lines (not shown) formed on the substrate 700 and the like. The wireless module 753 and antenna 754 allow the controller 7 to act as a wireless controller. The quartz oscillator 703 generates a reference clock of the microcomputer 751 described later.

As shown in FIG. 5B, at a front edge of a bottom main surface of the substrate 700, the image information calculation section 74 is provided. The image information calculation section 74 includes an infrared filter 741, a lens 742, the image pickup element 743 and an image processing circuit 744 which are located in this order from the front surface of the controller 7. These elements are attached to the bottom main surface of the substrate 700. At a rear edge of the bottom main surface of the substrate 700, the connector 73 is attached. The operation button 72i is attached on the bottom main surface of the substrate 700 behind the image information calculation section 74, and cells 705 are accommodated behind the operation button 72i. On the bottom main surface of the substrate 700 between the connector 73 and the cells 705, a vibrator 704 is attached. The vibrator 704 may be, for example, a vibration motor or a solenoid. The controller 7 is vibrated by an actuation of the vibrator 704, and vibration is conveyed to the player holding the controller 7. Thus, a so-called vibration-feedback game is realized.

With reference to FIG. 6, an internal structure of the controller 7 will be described. FIG. 6 is a block diagram showing the internal structure of the controller 7.

As shown in FIG. 6, the controller 7 includes therein, in addition to the above-described operation section 72 and image information calculation section 74, the communication section 75 and acceleration sensor 701.

The imaging information calculation section 74 includes the infrared filter 741, lens 742, image pickup element 743 and the image processing circuit 744. The infrared filter 741 allows, among lights incident on the front surface of the controller 7, only an infrared light to pass therethrough. The lens 742 converges the infrared light which has passed through the infrared filter 741, and outputs the infrared light to the image pickup element 743. The image pickup element 743 is a solid-state image pickup element such as a CMOS sensor or a CCD. The image pickup element 743 takes an image of the infrared light collected by the lens 742. In other words, the image pickup element 743 takes an image of only the infrared light which has passed through the infrared filter 741. Then, the image pickup element 743 generates image data of the image. The image data generated by the image pickup element 743 is processed by the image processing circuit 744. Specifically, the image processing circuit 744 processes the image data obtained from the image pickup element 743, detects an area of the image which has a high brightness, and outputs, to the communication section 75, process result data indicating, e.g., a calculated coordinate position, square measure, diameter and a width of the area. The imaging information calculation section 74 is fixed to the housing 71 of the controller 7. An imaging direction of the imaging information calculation section 74 can be changed by changing a facing direction of the housing 71. As described later in detail, a signal corresponding to a position and motion of the controller 7 is obtained in accordance with the process result data outputted by the imaging information calculation section 74.

The acceleration sensor 701 detects acceleration of the controller 7 for three axial directions of the controller 7, i.e., an up-down direction, a left-right direction, and a front-rear direction of the controller 7. As the acceleration sensor 701, an acceleration sensor for detecting the acceleration of the controller 7 in two of the three axial directions, i.e., the up-down direction and left-right direction, may be alternatively used in accordance with a necessary type of the operation signal. Data indicating the acceleration detected by the acceleration sensor 701 is outputted to the communication section 75.

As a non-limiting example, such a three-axis or two-axis acceleration sensor 701 may be of the type available from Analog Devices, Inc. or STMicroelectronics N.V. Preferably, the acceleration sensor 701 is an electrostatic capacitance or capacitance-coupling type that is based on silicon micro-machined MEMS (microelectromechanical systems) technology. However, any other suitable accelerometer technology (e.g., piezoelectric type or piezoresistance type) now existing or later developed may be used to provide the three-axis or two-axis acceleration sensor 701.

As one skilled in the art understands, accelerometers, as used in the acceleration sensor 701, are only capable of detecting acceleration along a straight line (linear acceleration) corresponding to each axis of the acceleration sensor. In other words, the direct output of the acceleration sensor 701 is limited to signals indicative of linear acceleration (static or dynamic) along each of the two or three axes thereof. As a result, the acceleration sensor 701 cannot directly detect movement along a non-linear (e.g. arcuate) path, rotation, rotational movement, angular displacement, tilt, position, attitude or any other physical characteristic.

However, through additional processing of the linear acceleration signals outputted from the acceleration sensor 701, additional information relating to the controller 7 can be inferred or calculated, as one skilled in the art will readily understand from the description herein. For example, by detecting static, linear acceleration (i.e., gravitational acceleration), the linear acceleration output of the acceleration sensor 701 can be used to infer tilt of an object (controller 7) relative to the gravity vector by correlating tilt angles with detected linear acceleration. In this way, the acceleration sensor 701 can be used in combination with the microcomputer 751 (or another processor) to determine tilt, attitude or position of the controller 7. Similarly, various movements and/or positions of the controller 7 can be calculated or inferred through processing of the linear acceleration signals generated by the acceleration sensor 701 when the controller 7 including the acceleration sensor 701 is subjected to dynamic accelerations by, for example, the hand of a user, as explained herein. In another embodiment, the acceleration sensor 701 may include an embedded signal processor or other type of dedicated processor for performing any desired processing of the acceleration signals outputted from accelerometers therein prior to outputting signals to the microcomputer 751. For example, the embedded or dedicated processor could convert the detected acceleration signal to a corresponding tilt angle when the acceleration sensor is intended to detect static acceleration (i.e., gravitational acceleration).

In another exemplary embodiment, the acceleration sensor 701 may be replaced with a gyro-sensor of any suitable technology incorporating, for example, a rotating or vibrating element. Exemplary MEMS gyro-sensors that may be used in this embodiment are available from Analog Devices, Inc. Unlike the acceleration sensor 701, a gyro-sensor is capable of directly detecting rotation (or angular rate) around an axis defined by a gyroscopic element (or elements) therein. Thus, due to fundamental differences between a gyro-sensor and an acceleration sensor (e.g., angular-based output and vector-based output), corresponding changes need to be made to the processing operations that are performed on the output signals from these devices depending on which device is selected for a particular application. Since characteristics of a gyroscope as well as fundamental differences between an accelerometer and a gyroscope are well known by the one skilled in the art, further descriptions thereof will be omitted. Although the gyro-sensor has the advantage of being capable of directly detecting rotation, the acceleration sensor is generally a cost-effective option as compared with the gyro-sensor when used for the controller of the present embodiment.

The communication section 75 includes the microcomputer 751, a memory 752, the wireless module 753 and the antenna 754. The microcomputer 751 controls the wireless module 753 for transmitting the transmission data while using the memory 752 as a storage area during processing.

Data from the controller 7 such as an operation signal (key data) from the operation section 72, acceleration signals (acceleration data) from the acceleration sensor 701, and the process result data from the imaging information calculation section 74 are outputted to the microcomputer 751. The microcomputer 751 temporarily stores inputted data (the key data, acceleration data and process result data) in the memory 752 as the transmission data which is to be transmitted to the receiving unit 6. Radio transmission from the communication section 75 to the receiving unit 6 is performed at predetermined time intervals. Since the game process is generally performed at a cycle of 1/60 sec, the radio transmission needs to be performed at a cycle of a shorter time period. Specifically, the game process is performed at a cycle of 16.7 ms (1/60 sec), and a transmission interval of the communication section 75 structured using the Bluetooth (registered trademark) technology is 5 ms. At a timing of performing a radio transmission to the receiving unit 6, the microcomputer 751 outputs, to the wireless module 753, the transmission data stored in the memory 752 as a series of pieces of operation information. The wireless module 753 uses, for example, the Bluetooth (registered trademark) technology to radiate, with a carrier wave having a predetermined frequency, the series of pieces of operation information from the antenna 754 as a radio signal. Thus, the key data from the operation section 72, the acceleration data from the acceleration sensor 701, and the process result data from the imaging information calculation section 74 are transmitted from the controller 7. The receiving unit 6 of the game apparatus 3 receives the radio signal, and the game apparatus 3 demodulates or decodes the radio signal to obtain the series of pieces of operation information (the key data, acceleration data and process result data). In accordance with the series of pieces of obtained operation information and the game program, the CPU 30 of the game apparatus 3 performs the game process. In the case where the communication section 75 is structured using the Bluetooth (registered trademark) technology, the communication section 75 can have a function of receiving transmission data which is wirelessly transmitted from the other devices.

Figure 8:
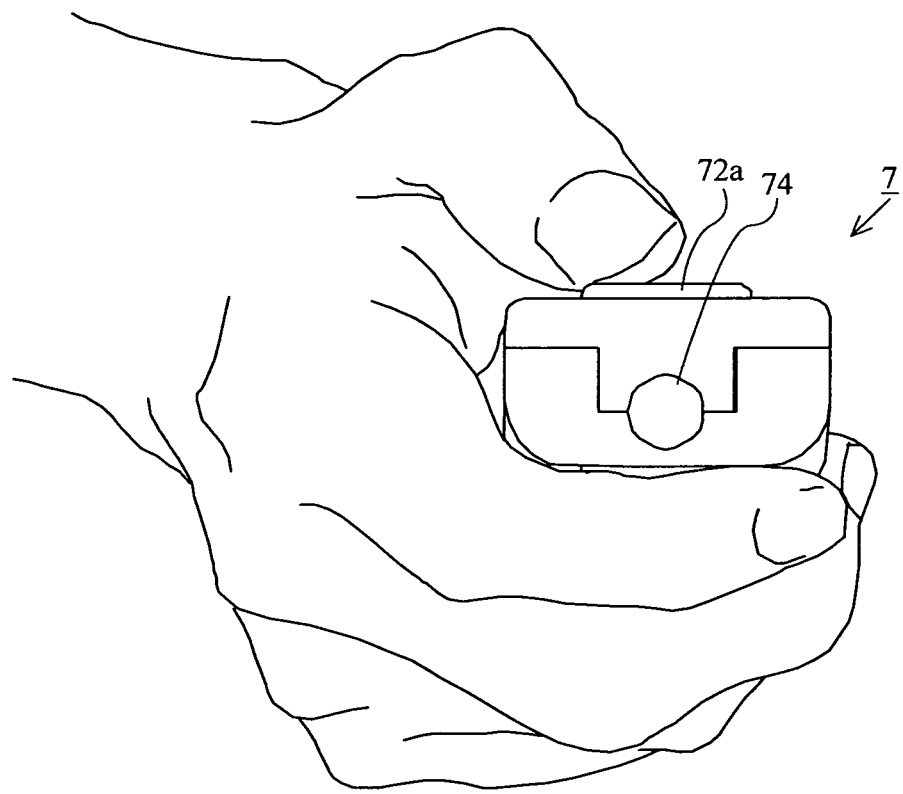
FIG. 8 shows an exemplary state of a player holding the controller 7 with a right hand as seen from a front surface side of the controller 7.

As shown in FIG. 7, in order to play a game with the game system 1 by using the controller 7, a player holds the controller 7 with one hand (for example, a right hand) (see FIGS. 8 and 9). The player holds the controller 7 so as to point the front surface of the controller 7 (that is, a side having an entrance through which a light is incident on the imaging information calculation section 74 taking an image of the light) to the monitor 2. Two markers 8L and 8R are provided in the vicinity of the display screen of the monitor 2. The markers 8L and 8R respectively output infrared lights forward from the monitor 2, and the infrared lights are used as imaging targets of the imaging information calculation section 74.

When a player holds the controller 7 so as to point the front surface thereof to the monitor 2, the infrared lights outputted from the two markers 8L and 8R are incident on the imaging information calculation section 74. The image pickup element 743 takes an image of the infrared lights which are incident on the image pickup element 743 through the infrared filter 741 and the lens 742, and the image processing circuit 744 processes the taken image. The imaging information calculation section 74 detects, from the taken image, infrared components outputted by the markers 8L and 8R so as to obtain positional information about the markers 8L and 8R (i.e., positions of target images in the taken image) and size information about the markers 8L and 8R such as a square measure, diameter and width thereof. Specifically, the image processing circuit 744 analyzes image data of the image taken by the image pickup element 743, and eliminates, from the size information about the taken image, information which is not about the infrared lights outputted by the markers 8L and 8R, and then identifies points each having a high brightness as positions of the markers 8L and 8R. The imaging information calculation section 74 obtains positional information which is information about a high brightness position such as the center of gravity of each of the identified points having a high brightness, and outputs the positional information as the process result data. Here, the positional information outputted as the process result data may be coordinate values indicating the brightness position, which are obtained by setting a predetermined reference point (for example, the center or the upper left corner of the taken image) in the taken image as a coordinate origin. Alternatively, the brightness position which is previously identified at a predetermined timing may be set as a reference point, and a vector indicating a positional difference between the reference point and the brightness position currently identified may be outputted as the process result data. That is, in the case where a predetermined reference point is set in the image taken by the image pickup element 743, the positional information about each of the target images in the taken image is a parameter indicating a positional difference from the predetermined reference point. When such positional information is transmitted to the game apparatus 3, the game apparatus 3 can obtain, based on a difference between a value representing the reference point and a value representing the positional information about each of the target images, an amount by which a signal changes in accordance with a motion, posture, position and the like of the imaging information calculation section 74 (i.e., the controller 7) with respect to the markers 8L and 8R. Specifically, the position of each point having a high brightness in the taken image, which is transmitted from the communication section 75, is changed in accordance with the motion of the controller 7, and a direction or coordinates corresponding to such a change of the position of each point having a high brightness is transmitted from the communication section 75. Upon receiving the direction or coordinates from the communication section 75, the game apparatus 3 recognizes and uses the direction or coordinates as an input from the communication section 75 which corresponds to a moving direction of the controller 7 in a three-dimensional space. In an exemplary game process described later, the imaging information calculation section 74 obtains at least coordinates of the center of gravity of a point having a high brightness for each of the target images of the markers 8L and 8R in the taken image, and outputs the coordinates as the process result data.

Also, the image information calculation section 74 obtains the size information indicating any of the square measure, diameter and width of each of the target images of the markers 8L and 8R in the taken image, thereby allowing the game apparatus 3 to analyze in detail the position of the controller 7 in 3D space. To be specific, even in the case where an image is taken by the image information calculation section 74 positioned diagonally from the markers 8L and 8R, i.e., even in the case where the player positioned diagonally from the monitor 2 operates the controller 7, the game apparatus 3 is able to obtain a distance between the controller 7 and the markers 8L and 8R. In the exemplary game process described later, another form is also described in which the game apparatus 3 obtains as the process result data the size information in addition to the above-described center of gravity coordinates.

Thus, the imaging information calculation section 74 of the controller 7 takes images of the stationary markers (infrared lights from the two markers 8L and 8R in the present embodiment), and the game apparatus 3 processes data outputted by the controller 7 during the game process. This enables an operation input to be performed in accordance with the motion, posture, position and the like of the controller 7.

Therefore, an operation input, which is different from an operation input made by pressing an operation button or using an operation key, is intuitively performed. As described above, since the markers are provided in the vicinity of the display screen of the monitor 2, the motion, posture, position and the like of the controller 7 with respect to the display screen of the monitor 2 can be easily calculated based on positions of the controller 7 with respect to the markers. That is, the process result data used for obtaining the motion, posture, position and the like of the controller 7 can be used as an operation input which directly affects an object displayed on the display screen of the monitor 2. Note that, in the game system 1, the distance between the controller 7 and the markers 8L and 8R, which is obtained by using the taken image of the markers 8L and 8R, can also be used as an operation input which directly affects an object displayed on the display screen of the monitor 2. This will be described later in detail.

With reference to FIGS. 8 and 9, a state of a player holding the controller 7 with one hand will be described. FIG. 8 shows an exemplary state of a player holding the controller 7 with a right hand as seen from a front surface side of the controller 7. FIG. 9 shows an exemplary state of a player holding the controller 7 with a right hand as seen from a left side of the controller 7.

As shown in FIGS. 8 and 9, the overall size of the controller 7 is small enough to be held by one hand of an adult or even a child. When the player puts a thumb on the top surface of the controller 7 (for example, near the cross key 72a), and puts an index finger in the recessed portion on the bottom surface of the controller 7 (for example, near the operation button 72i), a light entrance of the imaging information calculation section 74 on the front surface of the controller 7 is exposed forward from the player. It should be understood that also when the player holds the controller 7 with a left hand, the holding state is same as that described for the right hand.

Thus, the controller 7 allows a player to easily operate the operation section 72 such as the cross key 72a or the operation button 72i while holding the controller 7 with one hand. Further, when the player holds the controller 7 with one hand, the light entrance of the imaging information calculation section 74 on the front surface of the controller 7 is exposed, whereby the light entrance can easily receive the infrared lights from the aforementioned two markers 8L and 8R. As a result, the player can hold the controller 7 with one hand without preventing the imaging information calculation section 74 of the controller 7 from functioning. That is, when the player moves his or her hand holding the controller 7 with respect to the display screen, the controller 7 can perform an operation input by which a motion of the player's hand directly affects a displayed object on the display screen.

Figure 10:
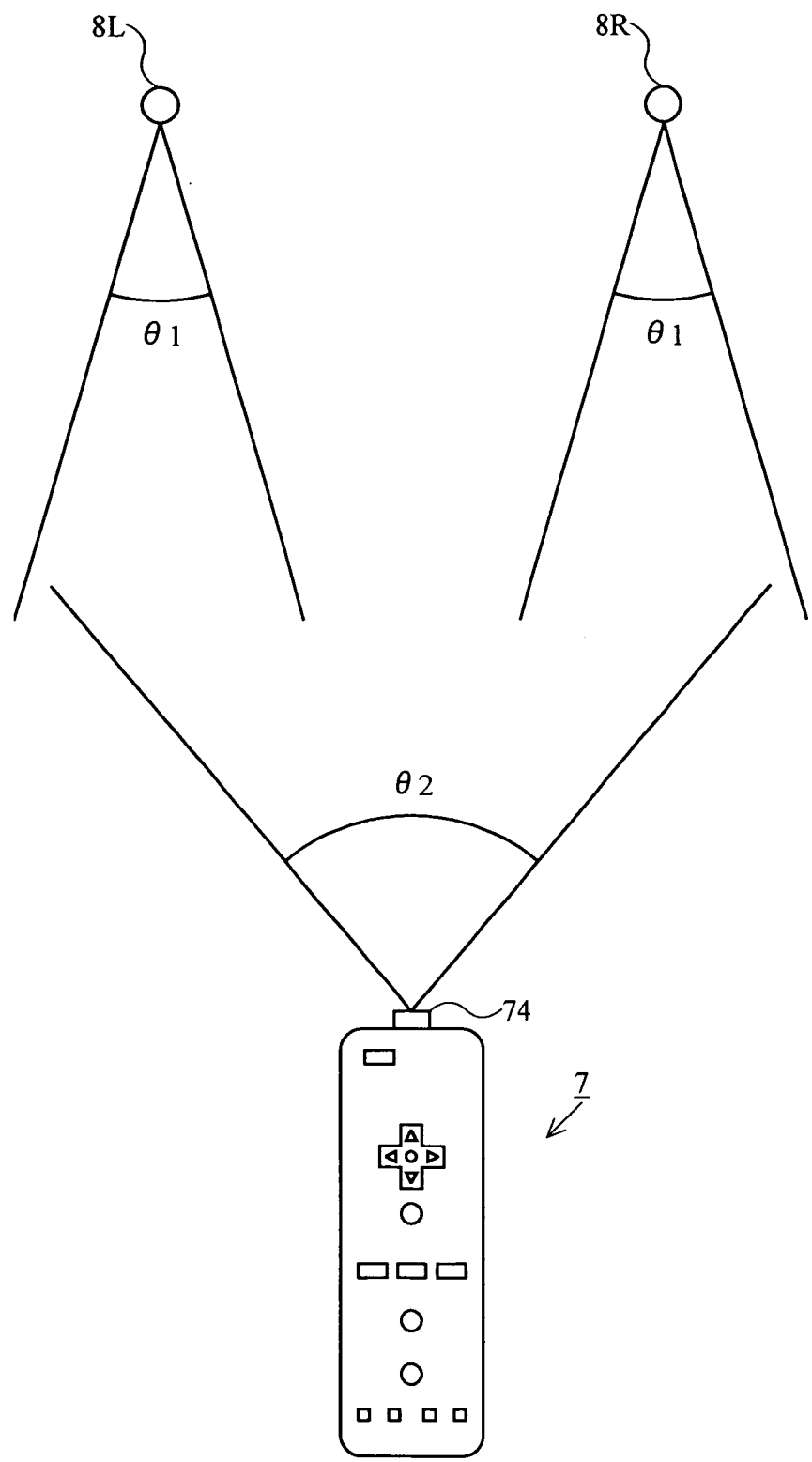
FIG. 10 illustrates viewing angles of an image information calculation section 74 and markers 8L and 8R.

As shown in FIG. 10, the markers 8L and 8R each have a viewing angle θ1. The image pickup element 743 has a viewing angle θ2. For example, each of the viewing angles θ1 of the markers 8L and 8R is 34 degrees (half-value angle), and the viewing angle θ2 of the image pickup element 743 is 41 degrees. When both the markers 8L and 8R are in the viewing angle θ2 of the image pickup element 743, and the image pickup element 743 is in the viewing angle θ1 of the marker 8L and the viewing angle θ1 of the marker 8R, the game apparatus 3 calculates a position of the controller 7 (including the distance between the controller 7 and the markers 8L and 8R) by using positional information about points on the two markers 8L and 8R, the points each having a high brightness.

Figure 11:
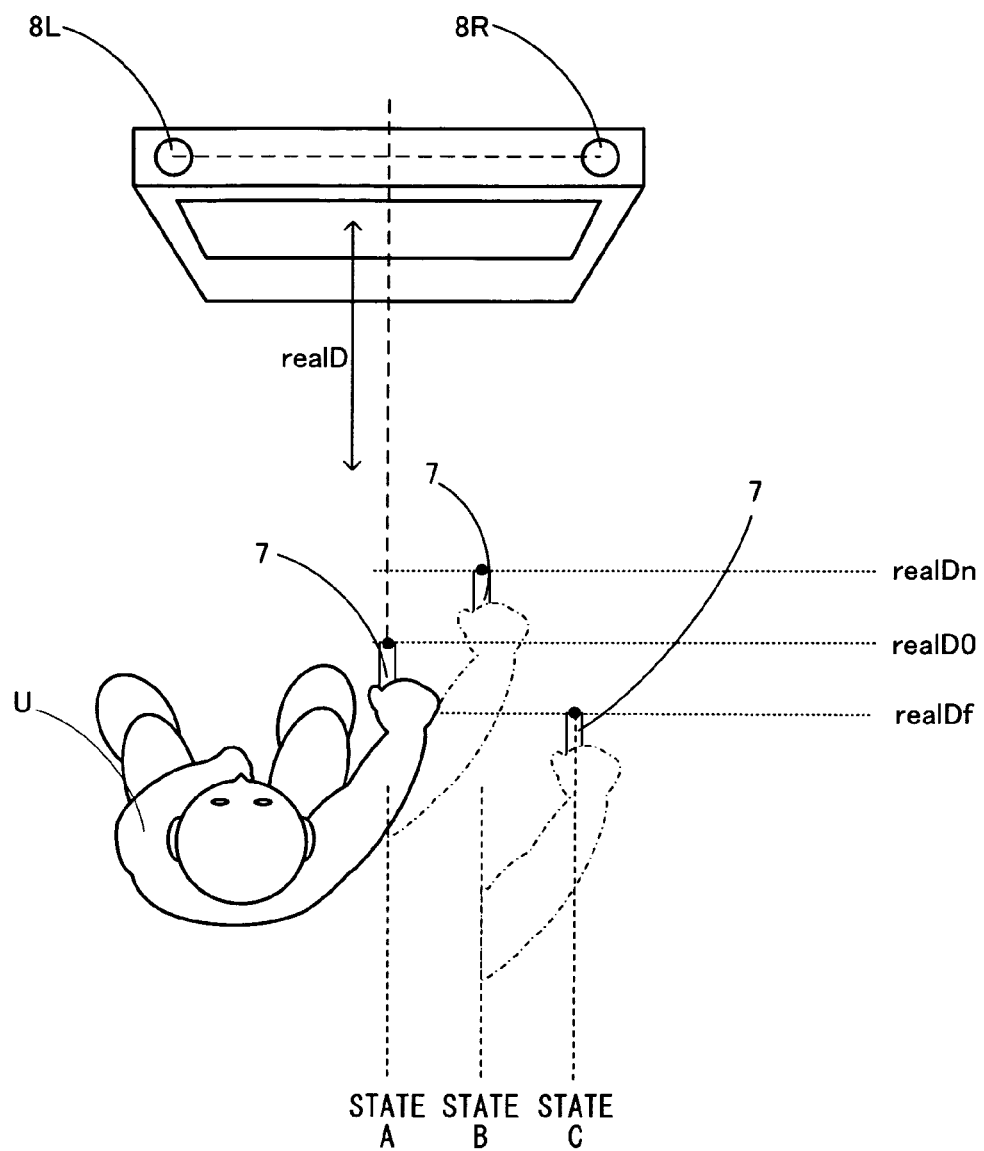
FIG. 11 is a top view showing an example in which a player U operates the controller 7 in a front-rear direction with respect to the markers 8L and 8R.

Next, an exemplary image, which is displayed on the monitor 2 in accordance with an operation performed by the player, will be described with reference to FIGS. 11 to 12C. FIG. 11 is a top view showing an example in which a player U operates the controller 7 in a front-rear direction with respect to the markers 8L and 8R. FIGS. 12A to 12C show exemplary images which are displayed on the monitor 2 in accordance with operations performed by the player U as shown in FIG. 11.

In FIG. 11, the player U holds the controller 7 so as to point the front face of the controller 7 to the markers 8L and 8R (i.e., to the monitor 2). Here, a distance between the front face of the controller 7 and a middle point between the markers 8L and 8R is referred to as a "distance realD". In a state A shown in FIG. 11, the player U holds the controller 7 such that the distance realD is realD0. The player U can change the distance realD, which is the distance between the front face of the controller 7 and the middle point between the markers 8L and 8R, by moving the controller 7 back and forth with respect to the monitor 2. For example, the player U may move the controller 7 forward to the monitor 2 while pressing the operation button 72i (drag button), such that the distance realD changes from realD0 to realDn (state B). Also, the player U may move the controller 7 backward from the monitor 2 while pressing the operation button 72i (drag button), such that the distance realD changes from realD0 to realDf (state C).

Figure 12A:
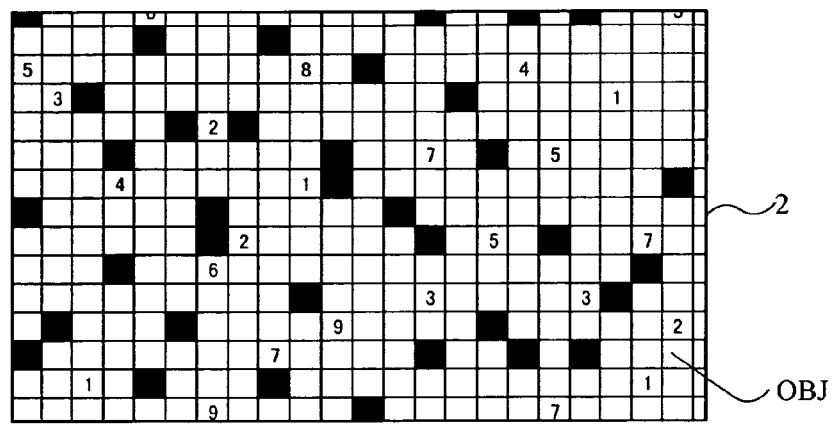
FIGS. 12A to 12C show exemplary images which are displayed on the monitor 2 in accordance with operations performed by the player U shown in FIG. 11.
Figure 12B:
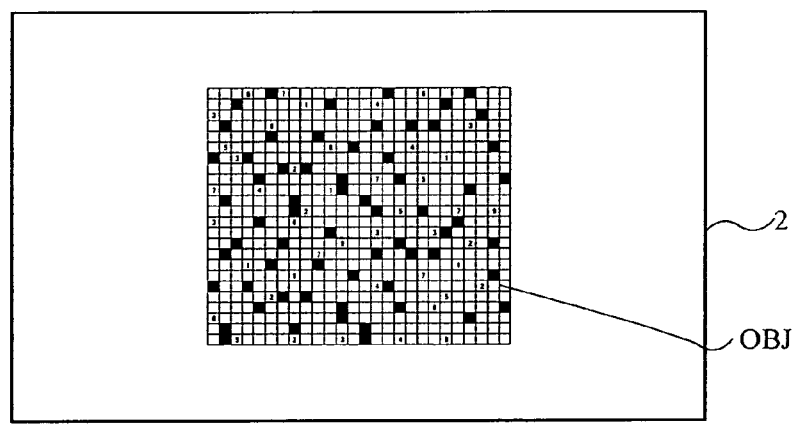
Figure 12C:
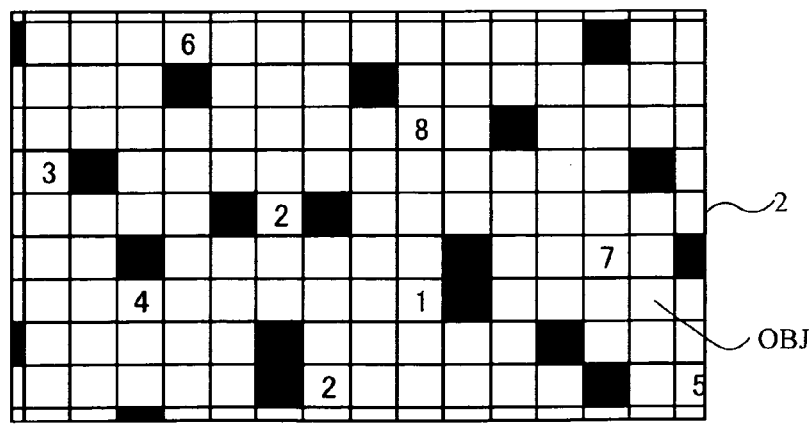

FIG. 12A is an exemplary image displayed on the monitor 2 when the controller 7 is in the state A. FIG. 12B is an exemplary image displayed on the monitor 2 when the controller 7 is in the state B. FIG. 12C is an exemplary image displayed on the monitor 2 when the controller 7 is in the state C. As shown in FIG. 12A, when the controller 7 is in the state A, the monitor 2 displays a part of an area in which a puzzle is drawn (a part of an object OBJ). In FIG. 12B, the object OBJ, which is displayed on the monitor 2 when the controller 7 is in the state A, is reduced in size, such that the entire object OBJ is displayed on the monitor 2. In other words, the player U can cause an object displayed on the monitor 2 to be reduced in size, by moving the controller 7 close to the monitor 2 while pressing the operation button 72i. In FIG. 12C, the object OBJ, which is displayed on the monitor 2 when the controller 7 is in the state A, is enlarged. In other words, the player U can enlarge an object displayed on the monitor 2, by distancing the controller 7 from the monitor 2 while pressing the operation button 72i.

Figure 13A:
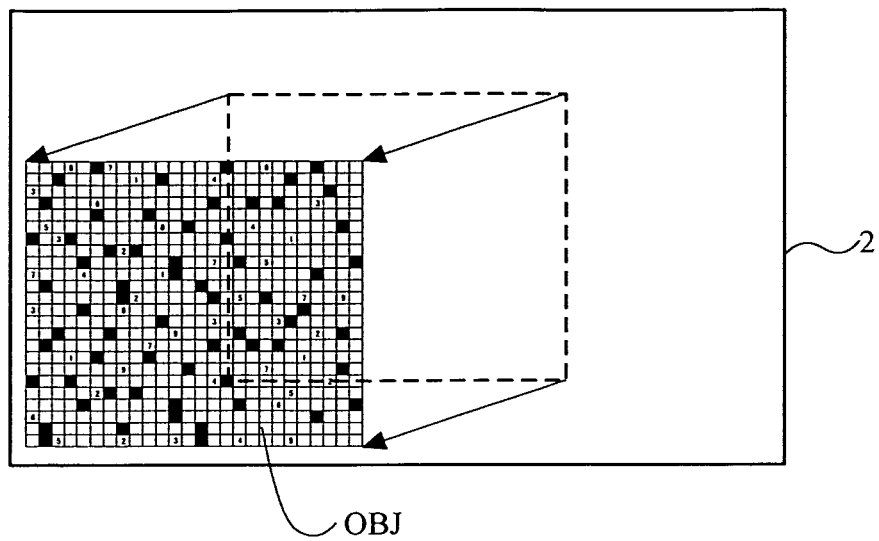
FIGS. 13A and 13B show examples of displaying an object OBJ on the monitor 2 when the controller 7 is moved from side to side and up and down and when the controller 7 is twisted to the right and left.
Figure 13B:
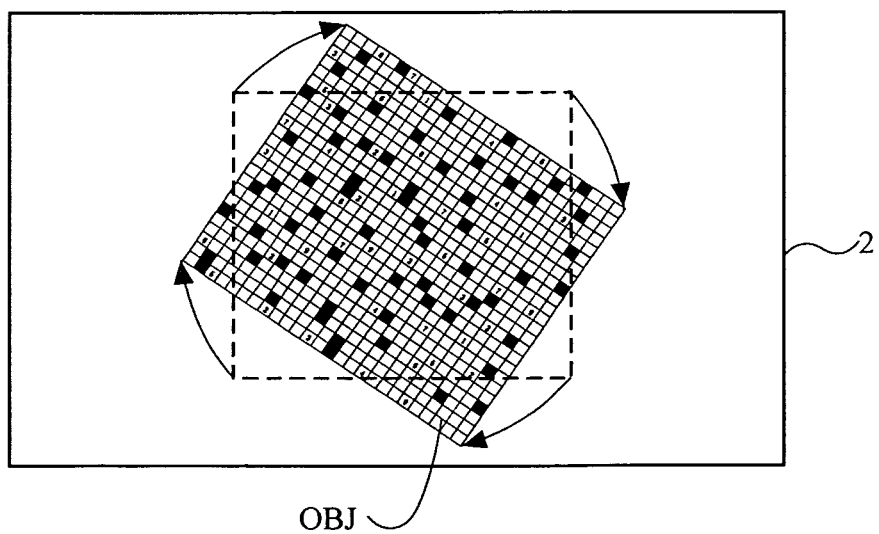

Further, the player U can cause an object displayed on the monitor 2 to move, by moving the controller 7 from side to side and up and down or twisting the controller 7 to the right and left with respect to the monitor 2 while pressing the operation button 72i. As shown in FIG. 13A, when the player U moves the controller 7 from side to side and up and down with respect to the monitor 2 while pressing the operation button 72i, the displayed object OBJ moves from side to side and up and down. Also, as shown in FIG. 13B, when the player U twists the controller 7 to the right and left while pressing the operation button 72i, the displayed object OBJ rotates to the right and left accordingly.

Figure 14:
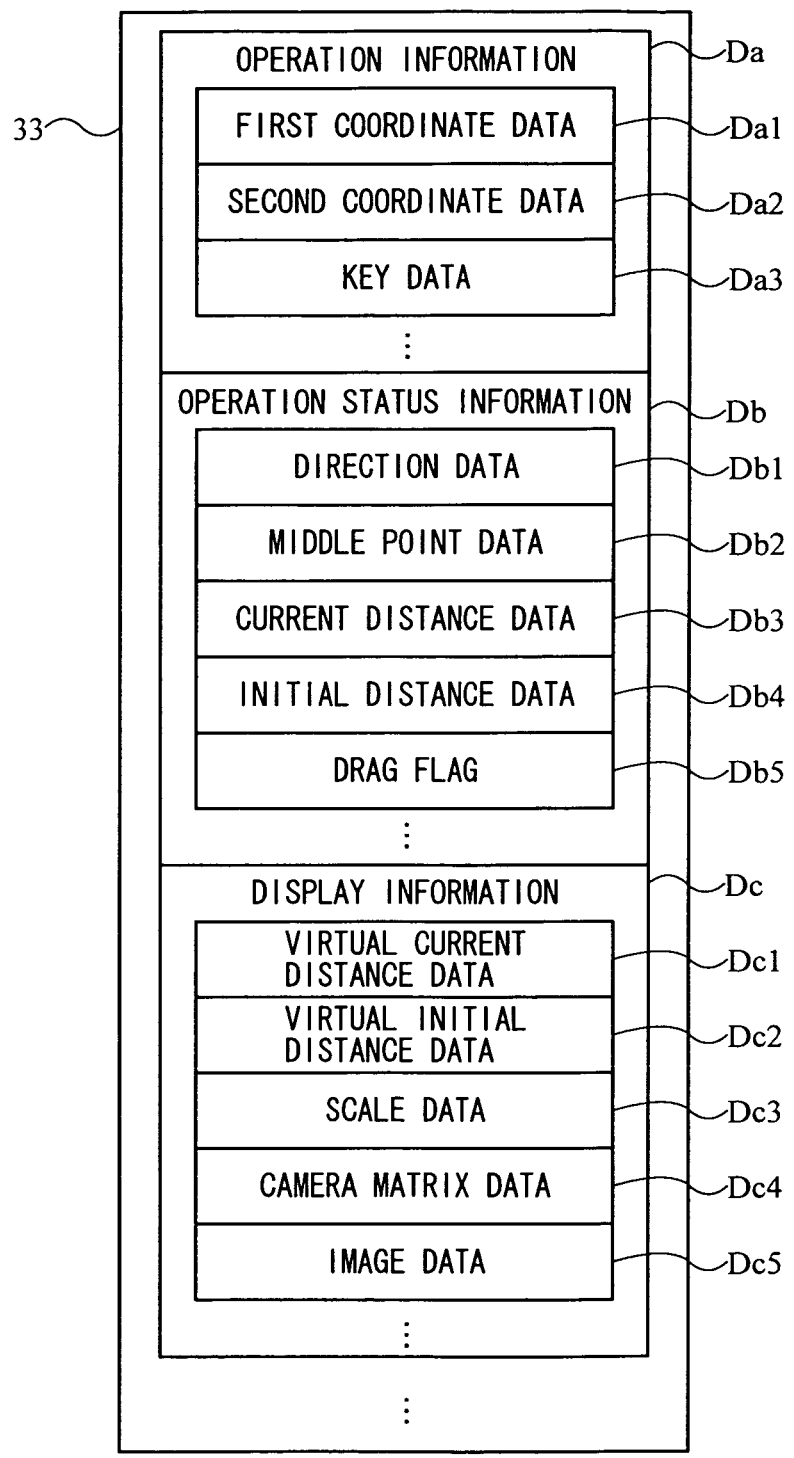
FIG. 14 shows an example of main data stored in a main memory 33 of the game apparatus 3.

Next, the game process performed in the game system 1 will be described in detail. First, main data used for the game process will be described with reference to FIG. 14. FIG. 14 shows the main data used for the game process, which is stored in the main memory 33 of the game apparatus 3.

As shown in FIG. 14, the main memory 33 stores operation information Da, operation status information Db, display information Dc and so on. In addition to data contained in the information shown in FIG. 14, the main memory 33 stores, as necessary, other data used for performing the game process.

The operation information Da is a series of pieces of operation information which are transmitted as transmission data from the controller 7. The operation information Da is information to be updated to latest operation information. The operation information Da contains first coordinate data Da1 and second coordinate data Da2 which correspond to the positional information of the above-described process result data. The first coordinate data Da1 is coordinate data indicating a position of one of the images of the two markers 8L and 8R in a image taken by the image pickup element 743. The second coordinate data Da2 is coordinate data indicating a position of the other of the images of the two markers 8L and 8R in the image taken by the image pickup element 743. The positions of the images of the markers are specified, for example, in a XY coordinate system on the taken image.

The operation information Da contains, in addition to the coordinate data (the first coordinate data Da1 and second coordinate data Da2) which is exemplary process result data obtained from the taken image, key data Da3 and the like obtained from the operation section 72. Note that, the receiving unit 6 of the game apparatus 3 receives the operation information Da transmitted from the controller 7 at predetermined time intervals, e.g., every 5 ms, and stores the information Da in a buffer (not shown) of the receiving unit 6. Thereafter, the information Da is read, e.g., every frame (every 1/60 sec), which corresponds to a timing of performing the game process. The newly read information Da is stored in the main memory 33.

The operation status information Db is information about an operation status of the controller 7 which is recognized based on the taken image. The operation status information Db is data which is obtained from, e.g., positions and directions of the target images (markers) contained in the taken image. To be specific, the operation status information Db contains direction data Db1, middle point data Db2, current distance data Db3, initial distance data Db4, drag flag Db5 and so on. The direction data Db1 indicates a direction from a point indicated by the first coordinate data Da1 to a point indicated by the second coordinate data Da2. It is assumed here that the direction data Db1 is a vector whose originating point is the point indicated by the first coordinate data Da1 and whose ending point is the point indicated by the second coordinate data Da2. The middle point data Db2 indicates coordinates of a middle point between the point indicated by the first coordinate data Da1 and the point indicated by the second coordinate data Da2. When the images of the two markers (markers 8L and 8R) are seen as one target image, the middle point data Db2 indicates a position of the one target image. The current distance data Db3 indicates the current distance realD which is a current distance between the controller 7 and the markers 8L and 8R and which is calculated based on the first coordinate data Da1 and second coordinate data Da2. The initial distance data Db4 indicates a distance initD which is a distance between the controller 7 and the markers 8L and 8R and which is obtained at a predetermined timing (e.g., a timing at which the player starts pressing the drag button). The drag flag Db5 is data indicating a drag flag isDrag used for determining whether or not the player is currently pressing the drag button.

The display information Dc contains virtual current distance data Dc1, virtual initial distance data Dc2, scale data Dc3, camera matrix data Dc4 and image data Dc5. The virtual current distance data Dc1 indicates a virtual current distance virtualD which is a result of converting the current distance realD into a corresponding distance in a virtual space created on the monitor 2. The virtual initial distance data Dc2 indicates a virtual initial distance init_virtualD which is the virtual current distance virtualD obtained at a predetermined timing (e.g., a timing at which the player starts pressing the drag button). The scale data Dc3 indicates a scale value Scale representing a size of a view of a virtual camera used for creating the virtual space on the monitor 2. The camera matrix data Dc4 indicates camera matrix representing movement, zooming, directional rotation, positional rotation and the like of the virtual camera. The image data Dc5 is used for placing, e.g., the object OBJ in the virtual space and generating an image thereof to be displayed on the monitor 2.

Figure 15:
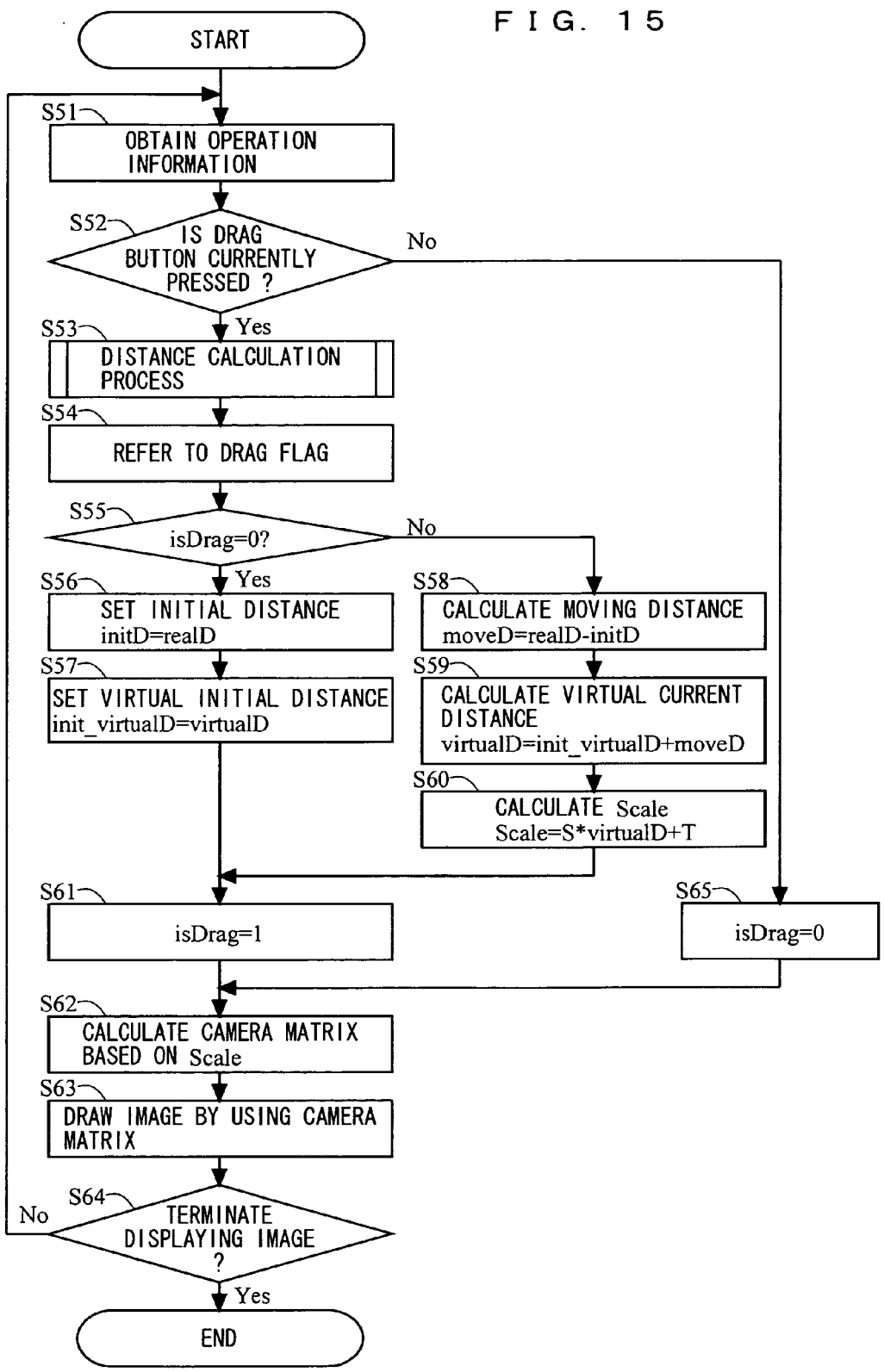
FIG. 15 is a flowchart showing an exemplary sequence of a game process performed by the game apparatus 3.
Figure 16:
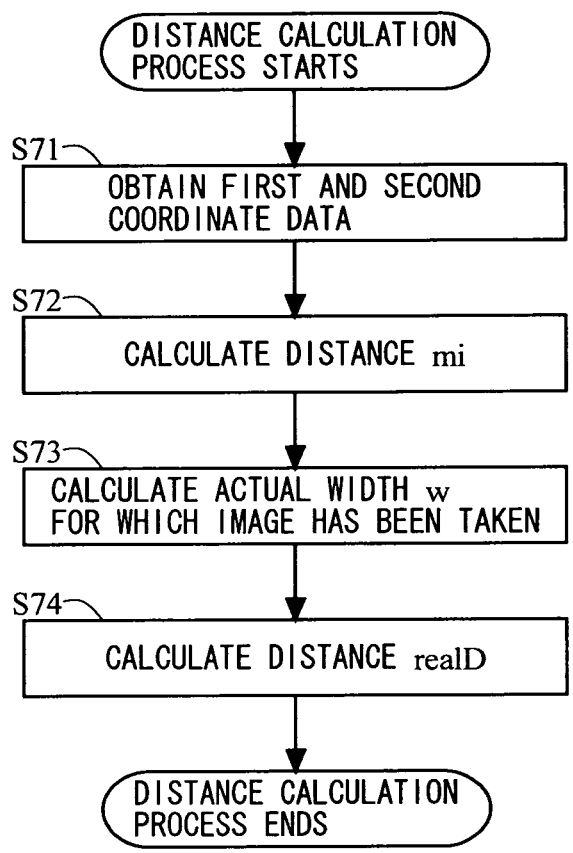
FIG. 16 is a subroutine showing in detail an exemplary distance calculation process at step 53 of FIG. 15.

Next, the game process performed by the game apparatus 3 will be described in detail with reference to FIGS. 15 to 17. FIG. 15 is a flowchart showing a sequence of the game process performed by the game apparatus 3. FIG. 16 is a subroutine showing in detail a distance calculation process at step 53 of FIG. 15. FIG. 17 is a diagram used to describe a manner of calculating the current distance realD. Flowcharts of FIGS. 15 and 16 show, among a plurality of processes in the game process, only an image enlarging/reducing process which is performed in accordance with operations of the controller 7 while the image processing program contained in the game program is executed, and descriptions of the other processes which are not directly related to the present invention will be omitted. In FIGS. 15 and 16, each step performed by the CPU 30 is abbreviated as "S".

When power is supplied to the game apparatus, the CPU 30 of the game apparatus 3 executes a boot program stored in a boot ROM (not shown), thereby initializing each unit such as the main memory 33. Then, after the game program stored in the optical disc 4 is loaded to the main memory 33, the CPU 30 starts executing the game program. The flowcharts shown in FIGS. 15 and 16 illustrate processes which are performed after such a boot process is completed.

As shown in FIG. 15, the CPU 30 first obtains the operation information received from the controller 7 (step 51), and then proceeds to the next step. Here, the CPU 30 stores the operation information in the main memory 33 as the operation information Da. The operation information obtained at step 51 contains, in addition to coordinate data indicating positions of the markers 8L and 8R in the taken image (the first coordinate data Da1 and second coordinate data Da2), data indicating a manner in which the operation section 72 of the controller 7 has been operated (key data Da3). It is assumed here that the communication section 75 transmits the operation information to the game apparatus 3 at predetermined time intervals (e.g., every 5 ms), and that the CPU 30 uses the operation information every frame. Accordingly, an iteration of processes at steps 51 to 64 is repeatedly performed every frame.

Next, the CPU 30 refers to the key data Da3, and determines whether or not the drag button is currently pressed (step 52). When the drag button is pressed, the CPU 30 proceeds to step 53. When the drag button is not pressed, the CPU 30 sets the drag flag isDrag written in the drag flag Db5 to 0 (step 65), and proceeds to step 62.

At step 53, the CPU 30 performs the distance calculation process, and then proceeds to the next step. In the distance calculation process, the current distance realD between the controller 7 and the markers 8L and 8R is calculated based on the first coordinate data Da1 and second coordinate data Da2, which have been transmitted from the controller 7 and stored in the main memory 33. Hereinafter, processes performed at step 53 will be described in detail with reference to FIGS. 16 and 17.

As shown in FIG. 16, the CPU 30 obtains the first coordinate data Da1 and second coordinate data Da2 (step 71), and calculates a distance mi (step 72). As shown in FIG. 17, the distance mi is a distance between two points in the taken image. These two points correspond to images of the markers 8L and 8R in the taken image, and coordinates indicating the two points are the first coordinate data Da1 and second coordinate data Da2. Accordingly, the CPU 30 uses the first coordinate data Da1 and second coordinate data Da2 to calculate the distance mi. To be specific, when the first coordinate data Da1 is position coordinates (Lx, Ly) and the second coordinate data Da2 is position coordinates (Rx, Ry), the distance mi is obtained by the following equation.

$$\text{mi} = \sqrt{(Rx - Lx)^2 + (Ry - Ly)^2} \qquad \text{[equation 1]}$$

Next, the CPU 30 calculates a width w (refer to FIG. 17) which indicates, with respect to setting positions of the markers 8L and 8R, a width for which the image pickup element 743 is able to take an image (step 73). The width w is obtained by the following equation.

$$w = wi \times m/mi$$

Here, m represents a setting distance between the markers 8L and 8R (actual setting distance between the the markers 8L and 8R; e.g., 20 cm), and is a fixed value. Also, wi represents a width wi of the image taken by the image pickup element 743 which corresponds to the width w. The width wi is also a fixed value. Since the setting distance m and width wi are fixed values, these values are prestored in storage means (not shown) within the game apparatus 3. Note that, the player is allowed to discretionarily determine the setting positions of the markers 8L and 8R in accordance with the player's environment, thereby determining the setting distance m. In such a case, the player is required to input a distance between the discretionarily determined setting positions of the markers 8L and 8R as the setting distance m so that the width w can be obtained from the above equation.

Next, the CPU 30 calculates the current distance realD (refer to FIG. 17) between the image pickup element 743 (controller 7) and the markers 8L and 8R, by using the width w and a viewing angle θ of the image pickup element 74, and updates the current distance data Db3 (step 74). Then, the distance calculation process in the subroutine ends. Here, the current distance realD is obtained by using the following equation.

$$\text{real}D = (w/2)/\{\tan(\theta/2)\}$$

Since the viewing angle θ is a fixed angle, the angle θ is prestored in the storage means (not shown) within the game apparatus 3.

Refer to FIG. 15 again. After the process for calculating the current distance realD at step 53 is completed, the CPU 30 refers to the drag flag Db5 (step 54), and determines whether or not the drag flag isDrag is 0 (step 55). When the drag flag isDrag is 0 (i.e., when the player has just started pressing the drag button), the CPU 30 proceeds to step 56. When the drag flag isDrag is 1 (i.e., when the player has been continuing pressing the drag button), the CPU 30 proceeds to step 58.

At step 56, the CPU 30 sets an initial distance initD to a value of the current distance realD calculated at step 53, and updates the initial distance data Db4. Next, the CPU 30 sets the virtual initial distance init_virtualD to a currently set value of the virtual current distance virtualD, and updates the virtual initial distance data Dc2 (step 57). Note that, if the virtual current distance virtualD is unset at this point, the CPU 30 sets the virtual initial distance init_virtualD to a default value, and updates the virtual initial distance data Dc2. Then, the CPU 30 proceeds to the next step 61.

At step 58, the CPU 30 calculates a moving distance moveD. To be specific, the CPU 30 calculates, by using the current distance realD calculated at step 53 and the initial distance initD which is stored in the main memory 33 as the initial distance data Db4, the moving distance moveD with the following equation.

$$\text{move}D = \text{real}D - \text{init}D$$

Next, the CPU 30 calculates the virtual current distance virtualD, and updates the virtual current distance data Dc1 (step 59). To be specific, the CPU 30 calculates, by using the moving distance moveD calculated at step 58 and the virtual initial distance init_virtualD which is stored in the main memory 33 as the virtual initial distance data Dc2, the virtual current distance virtualD with the following equation.

$$\text{virtual}D = \text{init\_virtual}D + \text{move}D$$

Then, the CPU 30 calculates the scale value Scale, and updates the scale data Dc3 (step 60). To be specific, the CPU 30 calculates, by using the virtual current distance virtualD which is stored in the main memory 33 as the virtual current distance data Dc1, the scale value Scale with the following equation.

$$\text{Scale} = S \times \text{virtual}D + T$$

Here, S and T are arbitrarily fixed numbers. The CPU 30 then proceeds to the next step 61.

Note that, as a result of setting the fixed number S to greater than 0 in the later-described drawing process for drawing an image, the player is enabled to enlarge an object displayed on the monitor 2 by distancing the controller 7 from the markers 8L and 8R. This allows the player to perform an intuitive operation in which the player feels as if the player were grabbing the object displayed on the monitor 2. Also, as a result of setting the fixed number S to less than 0, the player is enabled to reduce in size an object displayed on the monitor 2 by distancing the controller 7 from the markers 8L and 8R. This allows the player to perform an intuitive operation in which the player feels as if the player were operating a camera for taking an image to be displayed on the monitor 2.

At step 61, the CPU 30 sets the drag flag isDrag written in the drag flag Db5 to "1", and then proceeds to the next step 62.

At step 62, the CPU 30 calculates the camera matrix based on the scale value Scale, and updates the camera matrix data Dc4. Then, the CPU 30 proceeds to the next step. Here, when the camera matrix uses perspective projection matrix, the CPU 30 obtains the camera matrix by calculating, based on the scale value Scale which is stored in the main memory 33 as the scale data Dc3, a distance between a virtual camera and a focal point of the virtual camera. When the camera matrix uses orthogonal projection matrix, the CPU 30 obtains the camera matrix by calculating, based on the scale value Scale which is stored in the main memory 33 as the scale data Dc3, a size of a view of the virtual camera which is to be represented by the orthogonal projection matrix.

Next, the CPU 30 uses the camera matrix calculated at step 62 to draw an image, and displays the image on the monitor 2 (step 63). Then, the CPU 30 determines whether or not to terminate displaying the image (step 64). When the CPU 30 continues displaying the image, the CPU 30 returns to step 51, and repeats the above-described processes. When the CPU 30 terminates displaying the image, the CPU 30 ends the game process illustrated in the flowcharts.

Note that, at steps 62 and 63, two-dimensional image processing may be performed based on a currently set scale value Scale, and the monitor 2 may display a resultant two-dimensional image which is enlarged or reduced by changing as necessary a display size of the two-dimensional image. Such a manner of enlarging/reducing the displayed image also allows the displayed image to be enlarged/reduced in accordance with the distance between the controller 7 and the markers 8L and 8R.

When the player moves the controller 7 from side to side and up and down or twisting the controller 7 to the right and left with respect to the monitor 2 while pressing the drag button, an object displayed on the monitor 2 may be moved in accordance with such movement of the controller 7. In this case, the CPU 30, e.g., calculates the direction data Db1 indicating a direction from a point indicated by the first coordinate data Da1 to a point indicated by the second coordinate data Da2. To be specific, the CPU 30 refers to the position coordinates (Lx, Ly) indicated by the first coordinate data Da1 and the position coordinates (Rx, Ry) indicated by the second coordinate data Da2, and calculates a vector whose originating point is the point indicated by the first coordinate data Da1 and whose ending point is the point indicated by the second coordinate data Da2. Then, the CPU 30 updates the direction data Db1. Based on a difference between a direction indicated by the vector of the direction data Db1 and a predetermined reference direction, a rotation of the controller 7 with respect to a perpendicular direction from the monitor 2 to the front face of the controller 7 can be obtained. The CPU 30 calculates a direction change which has occurred in the direction indicated by the vector of the direction data Db1 while the drag button is pressed. Based on the direction change, the CPU 30 calculates camera matrix representing a rotation process of the virtual camera, and then draws an image of the object to be displayed on the monitor 2, the image having been taken by the virtual camera rotating as a result of the rotation process. Accordingly, the object displayed on the monitor 2 is rotated (FIG. 13B).

Also, the CPU 30 calculates the middle point data Db2 indicating a middle point between the point indicated by the position coordinates (Lx, Ly) of the first coordinate data Da1 and the point indicated by the position coordinates (Rx, Ry) of the second coordinate data Da2. To be specific, the CPU 30 refers to the first coordinate data Da1 and second coordinate data Da2, and calculates coordinates of the middle point. Then, the CPU 30 updates the middle point data Db2. Here, when the target images (markers 8L and 8R) in the taken image are seen as one image, the middle point data Db2 indicates a position of the one image. Based on a positional difference between the middle point indicated by the middle point data Db2 and the predetermined reference point, a positional change of the controller 7 in relation to the monitor 2 can be calculated. The CPU 30 calculates a positional change of the middle point indicated by the middle point data Db2, which occurs while the drag button is pressed. Based on the positional change, the CPU 30 calculates camera matrix representing a moving process of the virtual camera, and then draws an image of the object to be displayed on the monitor 2, which is taken by the virtual camera moving as a result of the moving process. Accordingly, the object displayed on the monitor 2 is moved from side to side and up and down (FIG. 13A). Note that, the middle point data Db2 may be converted to coordinates in a coordinate system on the display screen (designated coordinates), and the displayed object may be moved in accordance with a change in the designated coordinates. In this case, the designated coordinates are changed such that the designated coordinates indicate a position which is pointed by the controller 7. As a result of setting the displayed object, whose position coincides with the designated coordinates, as an object to be moved, the player is allowed to discretionarily move the displayed object pointed by the controller 7 by moving the controller 7. Also for the above-mentioned rotation process, as a result of setting the displayed object, whose position coincides with the designated coordinates, as an object to be rotated, the player is allowed to discretionarily rotate the displayed object pointed by the controller 7 by twisting the controller 7.

Figure 19:
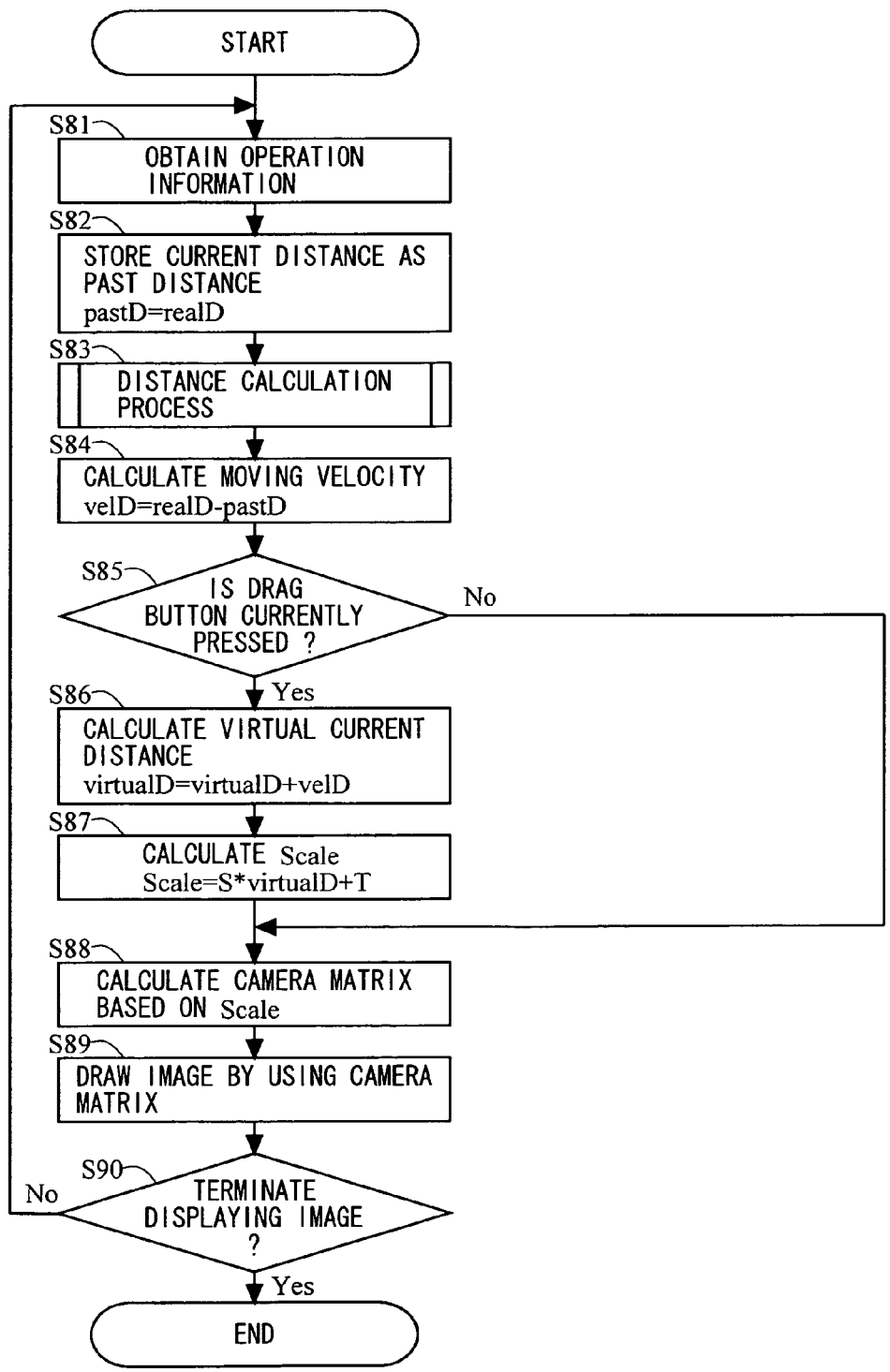
FIG. 19 is a flowchart showing another exemplary sequence of the game process performed by the game apparatus 3.

The above description of the game process has given an example in which a moving distance of the controller 7 is calculated while the drag button is pressed, and a displayed image is enlarged or reduced in accordance with the moving distance. Described below with reference to FIGS. 18 and 19 is another example in which a moving velocity of the controller 7 is calculated, and the displayed image is enlarged or reduced in accordance with the moving velocity. FIG. 18 shows main data stored in the main memory 33 of the game apparatus 3 in said another example. FIG. 19 is a flowchart showing a sequence of the game process performed by the game apparatus 3 in said another example. Described in the flowchart shown in FIG. 19 is only an image enlarging/reducing process among a plurality of processes in the game process, which is performed in accordance with operations of the controller 7 while the image processing program contained in the game program is executed, and detailed descriptions of the other processes which are not directly related to the present invention will be omitted. In FIG. 19, each step performed by the CPU 30 is abbreviated as "S". The flowchart shown in FIG. 19 shows processes which are performed after the above-described boot process is completed.

As shown in FIG. 18, the main memory 33 stores, e.g., the operation information Da, operation status information Db and display information Dc. Compared with the main data shown in FIG. 14, the main data shown in FIG. 18 additionally contains past distance data Db6 and moving velocity data Db 7 in the operation status information Db, and does not contain the initial distance data Db4, drag flag Db5 and virtual initial distance data Dc2. In FIG. 18, data which is identical with the data shown in FIG. 14 is denoted by a same reference numeral as that used for the data shown in FIG. 14, and a detailed description thereof will be omitted.

The past distance data Db6 indicates a past distance pastD which is a distance between the controller 7 and the markers 8L and 8R at the last frame. The moving velocity data Db7 indicates a moving velocity velD which is a moving velocity of the controller 7 with respect to the markers 8L and 8R.

As shown in FIG. 19, the CPU 30 first obtains operation information received from the controller 7 (step 81), and then proceeds to the next step. Since step 81 is identical with step 51, a detailed description thereof will be omitted.

Next, the CPU 30 sets the past distance pastD to a currently set value of the current distance realD, and updates the past distance data Db6 (step 82). Then, the CPU 30 performs the distance calculation process (step 83), and proceeds to the next step. Since the distance calculation process at step 83 is identical with that of step 53, a detailed description thereof will be omitted.

Thereafter, the CPU 30 calculates the moving velocity velD, and updates the moving velocity data Db 7 (step 84). To be specific, the CPU 30 calculates, by using the current distance realD calculated at step 83 and the past distance pastD set at step 82, the moving velocity velD with the following equation.

$$velD = realD - pastD$$

Then, the CPU 30 refers to the key data Da3 to determine whether or not the drag button is currently pressed (step 85). When the drag button is pressed, the CPU 30 proceeds to step 86. When the drag button is not pressed, the CPU 30 proceeds to step 88.

At step 86, the CPU 30 calculates the virtual current distance virtualD, and updates the virtual current distance data Dc1. To be specific, the CPU 30 calculates, by using the moving velocity velD calculated at step 84 and the virtual current distance virtualD which is stored in the main memory 33 as the virtual current distance data Dc1, a new virtual current distance virtualD with the following equation.

$$\text{virtual}D = \text{virtual}D + \text{vel}D$$

Then, the CPU 30 calculates the scale value Scale, and updates the scale data Dc3 (step 87). To be specific, the CPU 30 calculates, by using the virtual current distance virtualD which is stored in the main memory 33 as the virtual current distance data Dc1, the scale value Scale with the following equation.

$$\text{Scale} = S \times \text{virtual}D + T$$

Here, S and T are arbitrarily fixed numbers. The CPU 30 then proceeds to the next step 88.

At step 88, the CPU 30 calculates camera matrix based on the scale value Scale, and updates the camera matrix data Dc4. Next, the CPU 30 uses the camera matrix calculated at step 88 to draw an image, and displays the image on the monitor 2 (step 89). Then, the CPU 30 determines whether or not to terminate displaying the image (step 90). When the CPU 30 continues displaying the image, the CPU 30 returns to step 81, and repeats the above-described processes. When the CPU 30 terminates displaying the image, the CPU 30 ends the game process illustrated in the flowchart. Since the process for calculating the camera matrix at step 88 and the drawing process at step 89 are identical with the processes at steps 62 and 63, detailed descriptions thereof will be omitted.

Figure 20:
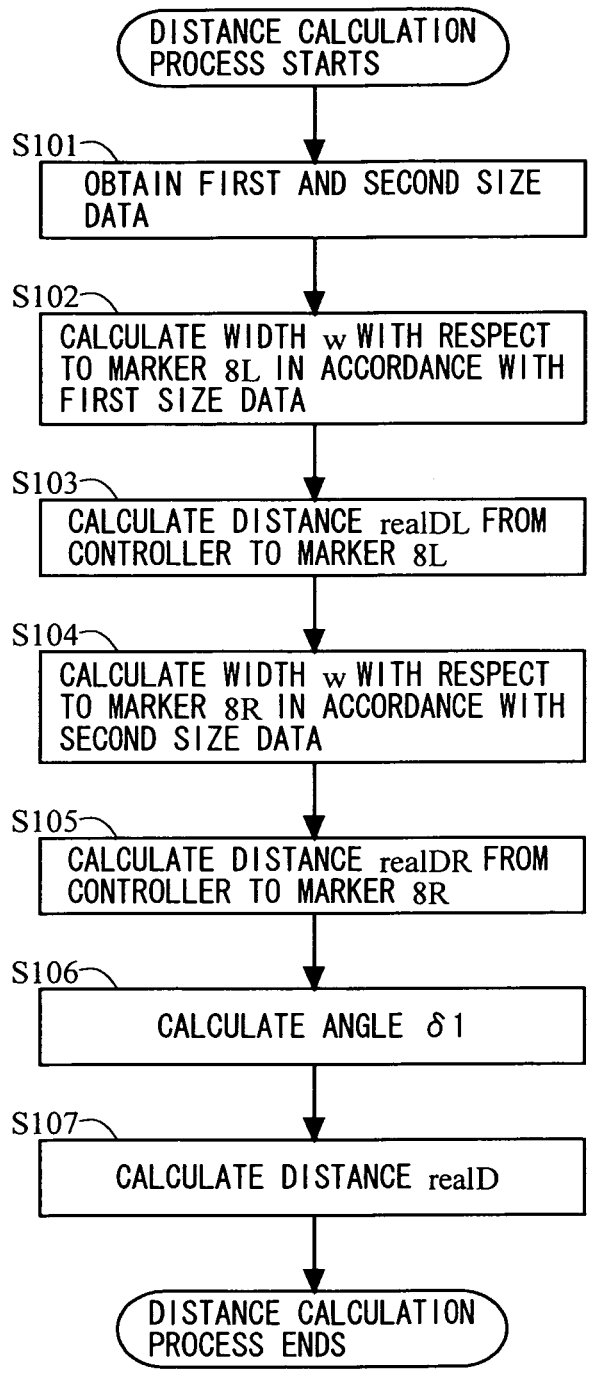
FIG. 20 is a subroutine showing in detail another exemplary distance calculation process.
Figure 22:
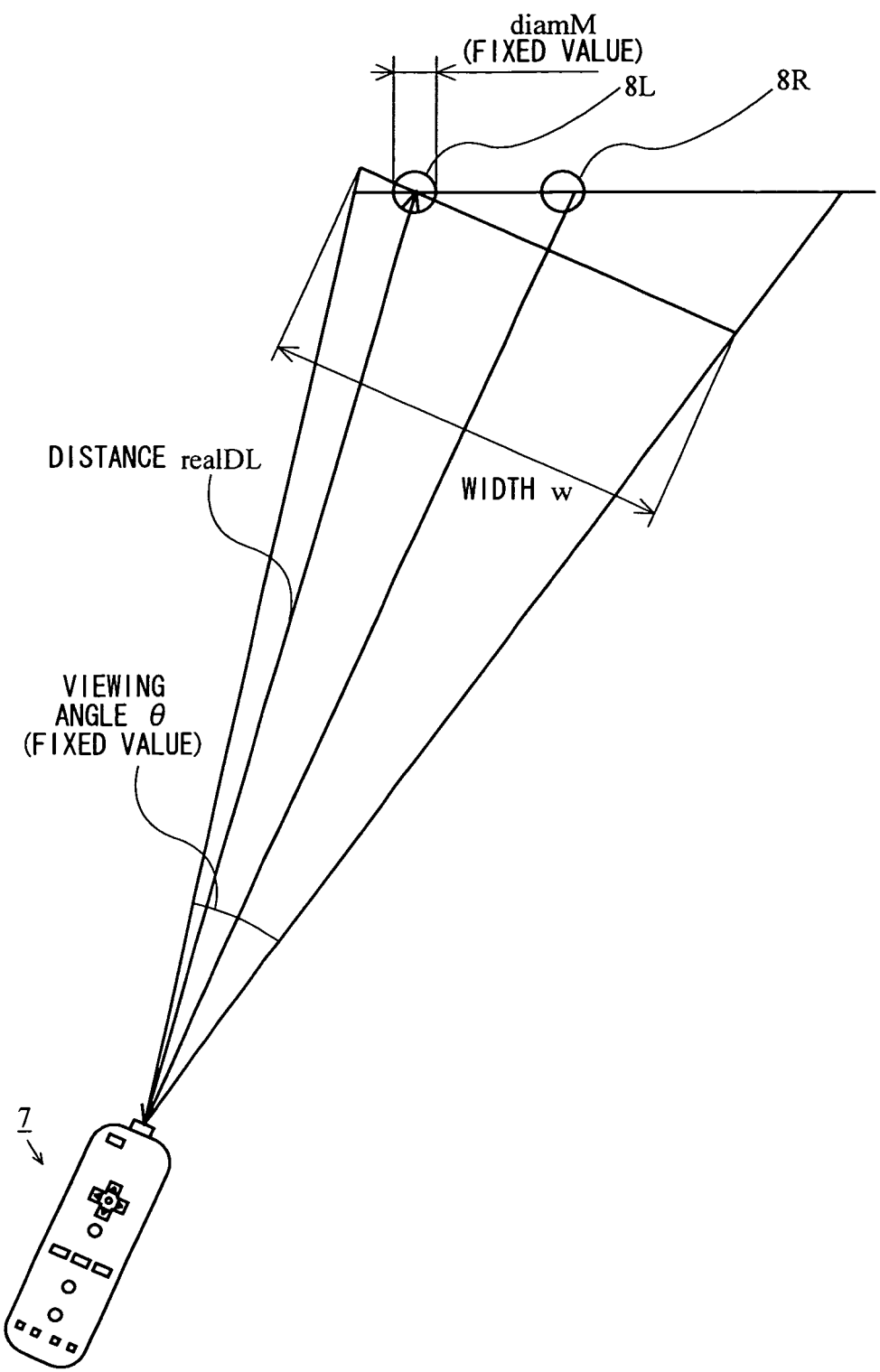
FIG. 22 is also a diagram used to describe said another exemplary manner of calculating the current distance realD.
Figure 23:
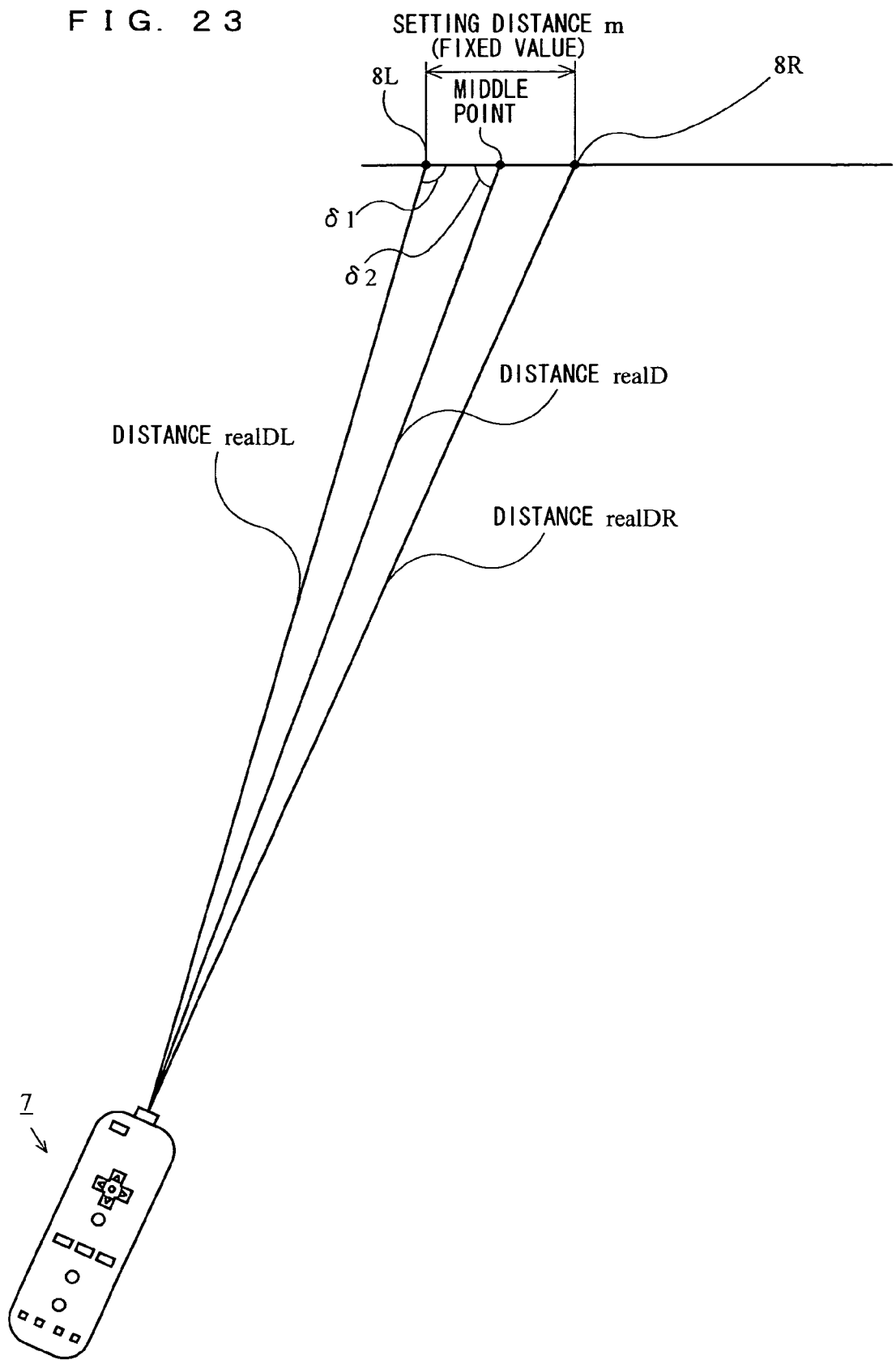
FIG. 23 is also a diagram used to describe said another exemplary manner of calculating the current distance realD.

Note that, when, in the distance calculation process performed at step 53 or 82, the controller 7 is diagonally positioned with respect to a line connecting the markers 8L and 8R, an error occurs in the current distance realD. Hereinafter, another example of the distance calculation process will be described with reference to FIGS. 20 to 23. FIG. 20 is a subroutine showing in detail the distance calculation process. FIGS. 21 to 23 are used to describe a manner of calculating the current distance realD in the distance calculation process.

In the distance calculation process descried below, size information in addition to the above-described first coordinate data Da1 and second coordinate data Da2 is obtained as the process result data. The size information indicates, e.g., a square measure, diameter or width of each of the target images of the markers 8L and 8R in the image taken by the image information calculation section 74. In the description below, an example will be given in which the size information, which indicates a diameter of the marker 8L in the image taken by the image information calculation section 74, and the size information, which indicates a diameter of the marker 8R in the image taken by the image information calculation section 74, are respectively obtained as first and second size data.

As shown in FIG. 20, the CPU 30 first obtains the first and second size data (step 101), and proceeds to the next step. As shown in FIG. 21, the first size data indicates a diameter diamL of the target image of the marker 8L in the taken image, and the second size data indicates a diameter diamR of the target image of the marker 8R in the taken image. Here, FIG. 21 shows a difference between the diameters diamL and diamR which occurs when the controller 7 is diagonally positioned with respect to the line connecting the markers 8L and 8R.

Based on the first size data (diameter diamL), the CPU 30 calculates a width w (see FIG. 22) which indicates, with respect to a setting position of the marker 8L, a width for which the image pickup element 743 is able to take an image (step 102). The width w is obtained from the following equation.

$$w = wi \times \text{diam}M / \text{diam}L$$

Here, diamM is a diameter (actual diameter) of each of the markers 8L and 8R, and is prestored as a fixed value in the storage means (not shown) within the game apparatus 3.

Next, by using the width w calculated at step 102 and a viewing angle θ of the image pickup element 743, the CPU 30 calculates a current distance realDL (see FIG. 22) which is a current distance between the marker 8L and the image pickup element 743 (controller 7) (step 103). The current distance realDL is obtained from the following equation.

$$\text{real}DL = (w/2) / \{\tan(\theta/2)\}$$

Since the viewing angle θ is a fixed angle, the viewing angle θ is prestored in the storage means (not shown) within the game apparatus 3.

Next, based on the second size data (diameter diamR), the CPU 30 calculates another width w which indicates, with respect to a setting position of the marker 8R, a width for which the image pickup element 743 is able to take an image (step 104). Said another width w is obtained from the following equation.

$$w = wi \times \text{diam}M / \text{diam}R$$

Then, by using said another width w calculated at step 104 and the viewing angle θ of the image pickup element 743, the CPU 30 calculates a current distance realDR between the marker 8R and the image pickup element 743 (controller 7) (step 105). Here, the current distance realDR is obtained from the following equation.

$$\text{real}DR = (w/2) / \{\tan(\theta/2)\}$$

Thereafter, the CPU 30 calculates an angle δ1 by using the current distance realDL, current distance realDR and setting distance m between the markers 8L and 8R (step 106). As shown in FIG. 23, the angle δ1 is between a line connecting the marker 8L and controller 7 and a line connecting the markers 8L and 8R. The angle δ1 is obtained from the following equation based on the cosine theorem.

$$\cos \delta1 = (\text{real}DL^2 \times m^2 - \text{real}DR^2) / (2 \times \text{real}DL \times m)$$

Subsequently, the CPU 30 calculates the current distance realD (see FIG. 23) between the controller 7 and the middle point between the markers 8L and 8R (step 107), and then the distance calculation process in the subroutine ends. Here, the current distance realD is obtained from the following equation based on the cosine theorem.

$$\text{real}D = \sqrt{\text{real}DL^2 + (m/2)^2 - 2 \times \text{real}DL \times (m/2) \times \cos\delta1} \quad \text{[equation 2]}$$

It is also possible to obtain an angle δ2 between a line connecting the controller 7 and said middle point and the line connecting the markers 8L and 8R. The angle δ2 is obtained from the following equation based on the cosine theorem by using the current distance realD, current distance realDL and setting distance m.

$$\cos \delta2 = \{\text{real}D^2 \times (m/2)^2 - \text{real}DL^2\} / \{2 \times \text{real}D \times (m/2)\}$$

Obtaining the angle δ2 allows the CPU 30 to calculate an angular position of the controller 7 with respect to the markers 8L and 8R, and various processes can be performed in accordance with the angular position of the controller 7.

As described above, the controller 7 takes an image of a plurality of stationary imaging targets. Alternatively, the controller 7 may take an image of a single stationary imaging target. Then, an image displayed on the monitor is enlarged and reduced in accordance with target image data indicating a space between a plurality of target images in the taken image or target image data indicating a size of a single target image in the taken image. The target image data indicating the space between the plurality of target images is, e.g., a distance between the plurality of target images in the taken image, and the target image data indicating the size of the single target image contains measurements (e.g., diameter and width) of the single target image in the taken image. For example, infrared lights emitted from the two markers 8L and 8R are a plurality of imaging targets, and a space (a distance mi) between target images of the two markers in a taken image is used as the target image data. Alternatively, when an infrared light from a single marker (e.g., the marker 8L) is a single imaging target, and a size of the single marker in a taken image is used as the target image data, a distance between a plurality of points on the single marker (e.g., both ends of the single marker) may be used as the target image data. In such a case, a diameter or the like (e.g., diameter diamL) of the single marker in the taken image is used as the target image data. A distance between the controller 7 and the imaging target(s) can be obtained by using the target image data, and an image displayed on the monitor can be enlarged or reduced in accordance with an increase or decrease in the distance between the controller 7 and the imaging target(s) or an increase or decrease in a moving speed of the controller 7. Thus, a new type of intuitive operation based on an operation distance of the controller 7 is realized. Note that, the above-described steps of calculating distances are merely examples. The steps may be simplified by using the target image data as distances.

The above description has given an example in which the displayed image is enlarged or reduced only while the drag button (operation button 72i) is pressed. However, regardless of whether or not the drag button is pressed, the displayed image may be enlarged or reduced each time a change occurs in the current distance realD. As a result, image processing for the image to be displayed on the monitor 2 fully uses changes in the distance between the controller 7 and the markers 8L and 8R, and the image is displayed accordingly. An image in an easily viewable size for the player can be displayed in accordance with a distance between the player (i.e., the controller 7 held by the player) and the monitor 2.

In the above description, the current distance realD is calculated by analyzing the image data of an image taken by the image pickup element 743. However, the present invention can be realized as long as the current distance realD to a predetermined measuring target placed in a real space is measured in any manner. For example, a supersonic sensor or a magnetic sensor may be used as means of calculating the current distance realD. The calculation of the current distance realD is not required to be performed if there is any manner in which a value related to a distance between the image pickup element 743 and an imaging target(s) is obtained without involving a calculation of the current distance realD, because operation inputs can be performed as long as such a value is obtained. In such a case, data corresponding to a distance between the markers 8L and 8R in the taken image may be prepared in advance, and by using the data, the game process may be performed without calculating the current distance realD.

Further, in the above description, the controller 7 and the game apparatus 3 are connected by radio communication. However, the controller 7 and game apparatus 3 may be electrically connected by a cable. In such a case, the cable connected to the controller 7 is connected to a connecting terminal of the game apparatus 3.

Although the above description has given an example in which the receiving unit 6 connected to the connecting terminal of the game apparatus 3 is used as reception means for receiving transmission data wirelessly transmitted from the controller 7, a reception module provided within the game apparatus 3 may be used as the reception means. In this case, the transmission data received by the reception module is outputted to the CPU 30 via the predetermined bus.

Further, in the above description, the image data of the image taken by the image pickup element 743 is analyzed to obtain the position coordinates, center of gravity coordinates and the like of the infrared lights emitted from the markers 8L and 8R. The process result data indicating such coordinates and the like is generated by the controller 7, and transmitted to the game apparatus 3. However, data, which can be obtained in the middle of a process performed by the controller 7 for generating the process result data, may be transmitted from the controller 7 to the game apparatus 3. For example, the image data of the image taken by the image pickup element 743 may be transmitted from the controller 7 to the game apparatus 3, and the process result data may be obtained as a result of analyzing the image data at the CPU 30. In this case, the image processing circuit 744 provided within the controller 7 is no longer necessary. Alternatively, data as a result of partly analyzing the image data may be transmitted from the controller 7 to the game apparatus 3. For example, data indicating a brightness, position, square measure and the like obtained from partly performing the analysis of the image data may be transmitted from the controller 7 to the game apparatus 3, and the rest of the analysis may be performed by the CPU 30 to obtain the process result data.

Still further, in the above description, the infrared lights from the markers 8L and 8R are the imaging targets of the image information calculation section 74 of the controller 7. However, a different object may be used as an imaging target. For example, one or more than three markers may be placed in the vicinity of the monitor 2, and an infrared light(s) emitted therefrom may be used as an imaging target(s) of the image information calculation section 74. For example, the present invention may be realized by placing near the monitor 2 a single marker having a predetermined length between both ends thereof, and using the predetermined length as the setting distance m (see FIG. 16). Alternatively, the display screen of the monitor 2 or another illuminant (e.g., interior light) may be used as the imaging target of the image information calculation section 74. Various illuminants may be used as imaging targets of the image information calculation section 74, by using a manner of calculating, based on a positional relationship between an imaging target and the display screen of the monitor, a position of the controller 7 in relation to the display screen of the monitor 2.

It is understood that the shapes of the controller 7 and the operation sections 72 mounted thereon, the number of operation sections 72, the positions in which the operation sections 72 are provided and the like in the above description are merely examples. The present invention can be realized even if these shapes, numbers, positions and the like are different from the above description. Also, the position of the image information calculation section 74 of the controller 7 (an entrance through which a light is incident on the imaging information calculation section 74) is not necessarily on the front face of the housing 71. The image information calculation section 74 may be provided on any other face of the housing 71 such that the image calculation section 74 externally receives a light.

Although the game apparatus 3 is operated by the controller 7 in the present embodiment, the game apparatus 3 may be a general information processing apparatus such as a personal computer which is operated by an input device having image pickup means. In such a case, a program executed by a computer of the general information processing apparatus is not limited to a game program typically used for playing a game. The executed program may be an all-purpose image processing program which is used for image processing by the general information processing apparatus.

The image processing apparatus and the storage medium storing the image processing program according to the example embodiment presented herein realize highly flexible operations, and are useful for, e.g., performing image processing for a game which is played by using physically separated units. The image processing program according to the example embodiment is useful as a program for performing such image processing for a game.

While the example embodiment has been described in detail, the foregoing description is in all aspects illustrative and not restrictive. It is understood that numerous other modifications and variations can be devised without departing from the scope of the example embodiment.

What is claimed is:

1. An image processing apparatus for performing predetermined image processing in accordance with an input operation performed by an input device including a drag button and an image pickup element for taking an image of a plurality of imaging targets, the image processing apparatus comprising:
    target image data obtaining means for sequentially obtaining, from the plurality of target images of the plurality of imaging targets in the image taken by the image pickup element, target image data indicating a distance between the plurality of target images;
    image processing means for performing enlargement and reduction of a display image of a user-operable object in a three-dimensional space displayed on a display device and controlled by a user in accordance with a change in the target image data;
    display control means for displaying on the display device the display image of the enlarged and reduced object processed by the image processing means, wherein the display image of the object is translated and rotated on the display device in accordance with an operation performed by the user,
    distance calculation means for, based on the target image data, sequentially calculating a distance between the image pickup element and the plurality of the imaging targets;
    enlarging/reducing means for performing the enlargement and reduction of the display image in accordance with a change in the distance, by sequentially changing, in accordance with the change in the distance, a position of a virtual camera placed in a virtual space,
    the distance calculation means for, when the drag button is depressed, calculating the distance between the image pickup element and the middle point between a first and a second imaging target, when the image pickup element is positioned diagonally with respect to the imaging targets, based on the target image data including the distance between the first and the second target images, a diameter diamL of the first target image, a diameter diamR of the second target image, and a predetermined diameter diamM of each of the plurality of imaging targets, including:
    a) calculating a width, w1, which indicates the range for which the image pickup element takes an image of the plurality of imaging targets with respect to a setting position of a first imaging target, the width, w1, given by $w1 = wi \times \text{diam}M/\text{diam}L$, where, wi is the width of the image taken by the image pickup element, diamM is the predetermined diameter of each of the plurality of imaging targets, and diamL is the diameter of the first imaging target;
    b) calculating the distance, realDL, between the first imaging target and the image pickup element, the distance, realDL, given by $\text{real}DL = (w1/2)/\{\tan(\theta/2)\}$, where θ is a viewing angle of the image pickup element;
    c) calculating a width, w2, which indicates the range for which the image pickup element takes an image of the plurality of imaging targets with respect to a setting position of a second imaging target, the width, w2, given by $w2 = wi \times \text{diam}M/\text{diam}R$, where, diamR is the diameter of the second imaging target;
    d) calculating the distance, realDR, between the second imaging target and the image pickup element, the distance, realDR, given by $\text{real}DR = (w2/2)/\{\tan(\theta/2)\}$;

e) calculating an angle, δ1, between a line connecting the first imaging target and the input device and a line connecting the first and second imaging targets, given by $\cos \delta 1 = (\text{real}DL^2 \times m^2 - \text{real}DR^2)/(2 \times \text{real}DL \times m)$, where m is the distance between the first and the second imaging targets; and
    f) calculating the distance between the image pickup element and the middle point between the first and the second imaging targets, realD, given by $\text{real}D = \sqrt{(\text{real}DL^2 + (m/2)^2 - 2 \times \text{real}DL \times (m/2) \times \cos \delta 1)}$;
    and
    velocity calculating means for calculating a moving velocity velD of the input device based on successively-calculated values of said calculated distance realD.

2. The image processing apparatus according to claim 1, wherein
    the image processing means enlarges the display image in accordance with an increase in the distance, and reduces the display image in accordance with a decrease in the distance.

3. The image processing apparatus according to claim 1, wherein
    the image processing means reduces the display image in accordance with an increase in the distance, and enlarges the display image in accordance with a decrease in the distance.

4. The image processing apparatus according to claim 1, wherein
    the image processing means performs enlargement and reduction of the display image in accordance with the change which occurs, during a predetermined time period, in the distance.

5. The image processing apparatus according to claim 4, wherein
    the image processing means enlarges the display image in accordance with an increase in the distance, and reduces the display image in accordance with a decrease in the distance.

6. The image processing apparatus according to claim 4, wherein
the image processing means reduces the display image in accordance with an increase in the distance, and enlarges the display image in accordance with a decrease in the distance.

7. The image processing apparatus according to claim 4, wherein the input device includes at least one pressable operation key and outputs at least operation information corresponding to a state of the operation key being pressed, the apparatus further comprising:
operation information obtaining means for obtaining the operation information; and
storage locations for, when the operation information indicates that the operation key has just started being pressed, storing the distance calculated by the distance calculation means, wherein
the image processing means includes difference calculation means for obtaining the change in the distance, which occurs during the predetermined time period which is a time period during which the operation key is pressed, by sequentially calculating a difference between the distance stored in the storage locations and the distance which is calculated, while the operation information indicates that the operation key is currently pressed, by the distance calculation means, and
the image processing means performs the enlargement and reduction of the display image in accordance with the difference.

8. The image processing apparatus according to claim 7, wherein
the image processing means enlarges the display image in accordance with an increase in the distance, and reduces the display image in accordance with a decrease in the distance.

9. The image processing apparatus according to claim 7, wherein
the image processing means reduces the display image in accordance with an increase in the distance, and enlarges the display image in accordance with a decrease in the distance.

10. The image processing apparatus according to claim 1, further comprising
designated coordinates calculation means for, based on positions of the plurality of target images in the taken image, calculating designated coordinates associated with a display area of the display device, wherein
the image processing means moves the display image in accordance with a change in the designated coordinates.

11. The image processing apparatus according to claim 1, further comprising
tilt calculation means for, based on positions of the plurality of target images in the taken image, calculating a tilt of the input device, wherein
the image processing means rotates the display image in accordance with a change in the tilt.

12. The image processing apparatus according to claim 1, wherein
the image processing means performs enlargement and reduction of the display image by sequentially changing, in accordance with the change in the distance, a display size of a two-dimensional image.

13. The image processing apparatus according to claim 1, wherein
the image processing means performs enlargement and reduction of the display image in accordance with the moving velocity.

* * * * *